(12) United States Patent
Chauhan et al.

(10) Patent No.: US 10,282,598 B2
(45) Date of Patent: May 7, 2019

(54) PERFORMING IMAGE ANALYSIS FOR DYNAMIC PERSONNEL IDENTIFICATION BASED ON A COMBINATION OF BIOMETRIC FEATURES

(71) Applicant: Bank of America Corporation, Charlotte, NC (US)

(72) Inventors: Sandeep Kumar Chauhan, Hyderabad (IN); Pinak Chakraborty, Hyderabad (IN); Vidhu Beohar, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 25 days.

(21) Appl. No.: 15/452,310

(22) Filed: Mar. 7, 2017

(65) Prior Publication Data

US 2018/0260615 A1    Sep. 13, 2018

(51) Int. Cl.
*G06K 9/00* (2006.01)
*G06T 7/73* (2017.01)
(Continued)

(52) U.S. Cl.
CPC ..... *G06K 9/00288* (2013.01); *G06K 9/00302* (2013.01); *G06K 9/00335* (2013.01); *G06K 9/00744* (2013.01); *G06K 9/00771* (2013.01); *G06K 9/6224* (2013.01); *G06T 7/73* (2017.01); *H04L 67/10* (2013.01); *H04L 67/125* (2013.01); *H04L 67/18* (2013.01); *H04L 67/306* (2013.01); *G06T 2207/30196* (2013.01)

(58) Field of Classification Search
CPC .. G06K 9/00288; G06K 9/00335; G06T 7/73; H04L 67/10; H04L 67/306
See application file for complete search history.

(56) References Cited

U.S. PATENT DOCUMENTS 7,249,123 B2    7/2007  Elder et al.
7,688,349 B2    3/2010  Flickner et al.
(Continued)

OTHER PUBLICATIONS

Facial Recognition System, Wikipedia (Mar. 7, 2017), https://en.wikipedia.org/wiki/Facial_recognition_system.
(Continued)

*Primary Examiner* — Ruiping Li
(74) *Attorney, Agent, or Firm* — Banner & Witcoff, Ltd.; Michael A. Springs

(57) ABSTRACT

A computing platform may receive video, audio, and/or biometric information of one or more people. The computing platform may identify the people based on a comparison of the video, audio, and/or biometric information to stored information in one or more user profiles each associated with the people. For example, the computing platform may compare multiple types of biometric information, including fingerprint, retina scan, facial features, and the like, as part of a process for identifying the people. The computing platform may further determine one or more interactions between the people, and, based on the interactions, determine and/or identify a relationship between the people. The identified relationships may further be used for confirming identifies of the people. Based on the identifications (e.g., biometric, video, audio, relationships), the computing platform may further provide access for the people to one or more services.

26 Claims, 19 Drawing Sheets

(51) Int. Cl.
*H04L 29/08* (2006.01)
*G06K 9/62* (2006.01)

(56) References Cited

U.S. PATENT DOCUMENTS

| | | | |
|---|---|---|---|
| 8,064,656 | B2 | 11/2011 | Fukushima et al. |
| 8,180,804 | B1 | 5/2012 | Narayanan et al. |
| 8,189,928 | B2* | 5/2012 | Gotoh et al. |
| 9,087,273 | B2 | 7/2015 | Garcia et al. |
| 9,213,903 | B1 | 12/2015 | Laska et al. |
| 9,317,530 | B2 | 4/2016 | Papakipos et al. |
| 2004/0008873 | A1 | 1/2004 | Sogo et al. |
| 2005/0171955 | A1 | 8/2005 | Hull et al. |
| 2005/0256756 | A1 | 11/2005 | Lam et al. |
| 2006/0042483 | A1 | 3/2006 | Work et al. |
| 2006/0251339 | A1 | 11/2006 | Gokturk et al. |
| 2007/0177805 | A1 | 8/2007 | Gallagher |
| 2008/0040475 | A1 | 2/2008 | Bosworth et al. |
| 2008/0080743 | A1 | 4/2008 | Schneiderman et al. |
| 2008/0080745 | A1 | 4/2008 | Vanhoucke et al. |
| 2008/0288612 | A1 | 11/2008 | Kwon |
| 2009/0074258 | A1 | 3/2009 | Cotgreave |
| 2009/0119167 | A1 | 5/2009 | Kendall et al. |
| 2009/0185723 | A1 | 7/2009 | Kurtz et al. |
| 2010/0063993 | A1 | 3/2010 | Higgins et al. |
| 2010/0076850 | A1 | 3/2010 | Parekh et al. |
| 2010/0142762 | A1 | 6/2010 | Morita |
| 2010/0172551 | A1 | 7/2010 | Gilley et al. |
| 2010/0179874 | A1 | 7/2010 | Higgins et al. |
| 2010/0245567 | A1 | 9/2010 | Krahnstoever et al. |
| 2010/0257023 | A1 | 10/2010 | Kendall et al. |
| 2011/0038512 | A1 | 2/2011 | Petrou et al. |
| 2011/0044512 | A1 | 2/2011 | Bambha et al. |
| 2011/0129145 | A1 | 6/2011 | Perlmutter et al. |
| 2011/0182482 | A1 | 7/2011 | Winters et al. |
| 2011/0211737 | A1 | 9/2011 | Krupka et al. |
| 2011/0235859 | A1 | 9/2011 | Imoto |
| 2012/0039514 | A1 | 2/2012 | Sun et al. |
| 2012/0076367 | A1 | 3/2012 | Tseng |
| 2012/0110071 | A1 | 5/2012 | Zhou et al. |
| 2012/0114199 | A1 | 5/2012 | Panyam et al. |
| 2012/0166532 | A1 | 6/2012 | Juan et al. |
| 2012/0250950 | A1 | 10/2012 | Papakipos et al. |
| 2012/0303659 | A1 | 11/2012 | Erhart et al. |
| 2012/0321143 | A1 | 12/2012 | Krupka et al. |
| 2013/0006634 | A1 | 1/2013 | Grokop et al. |
| 2013/0077833 | A1 | 3/2013 | Kritt et al. |
| 2013/0336520 | A1* | 12/2013 | Vanhoucke ............ G06Q 30/02 382/100 |
| 2018/0077344 | A1* | 3/2018 | Bostick ............. H04N 5/23219 |

OTHER PUBLICATIONS

Biometrics, Wikipedia (Mar. 7, 2017), https://en.wikipedia.org/wiki/Biometrics.
Gait Analysis, Wikipedia (Mar. 7, 2017), https://en.wikipedia.org/wiki/Gait_analysis.
Voice Analysis, Wikipedia (Mar. 7, 2017), https://en.wikipedia.org/wik/Voice_analysis.
Forensic Identification, Wikipedia (Mar. 7, 2017), https://en.wikipedia.org/wiki/Forensic_identification.

* cited by examiner

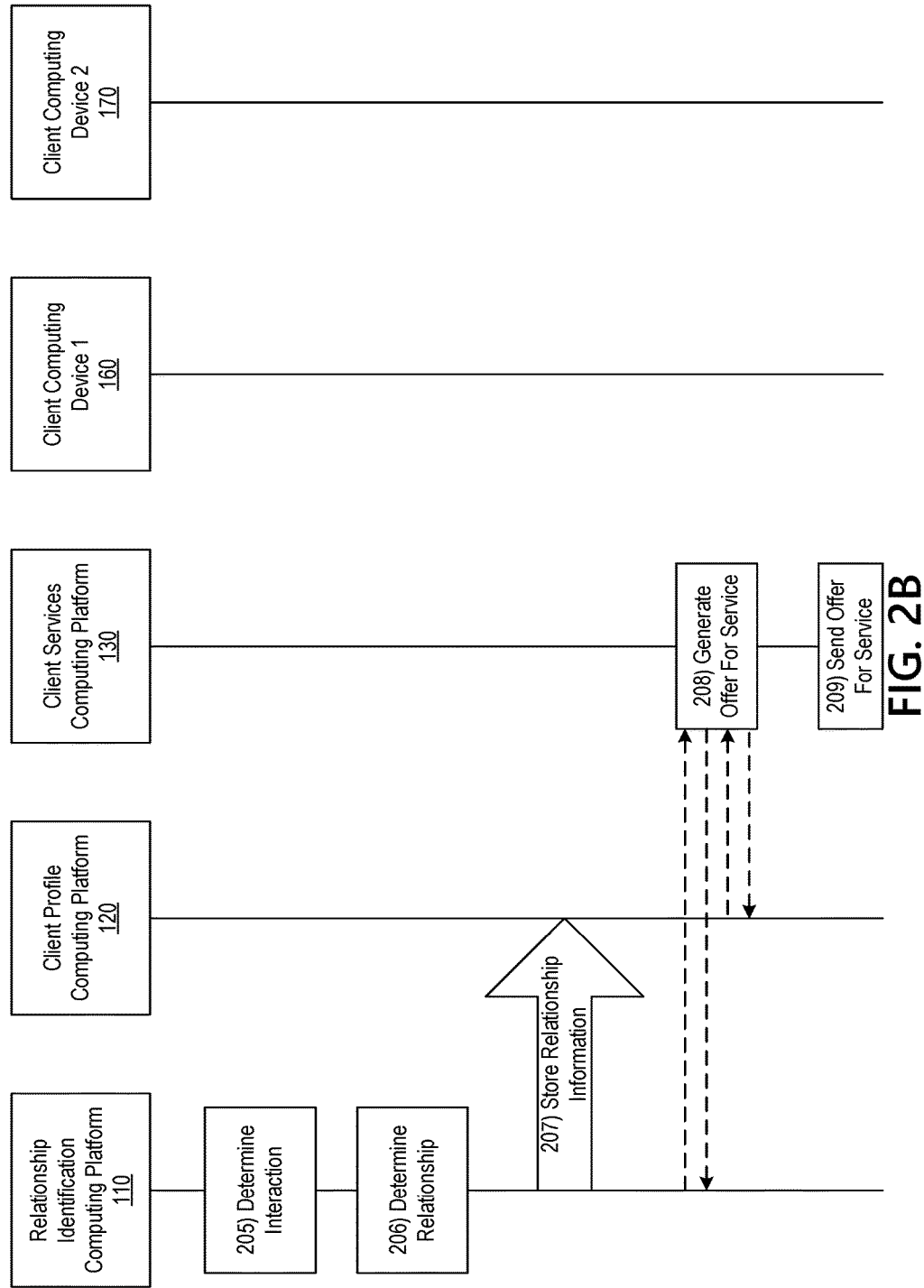

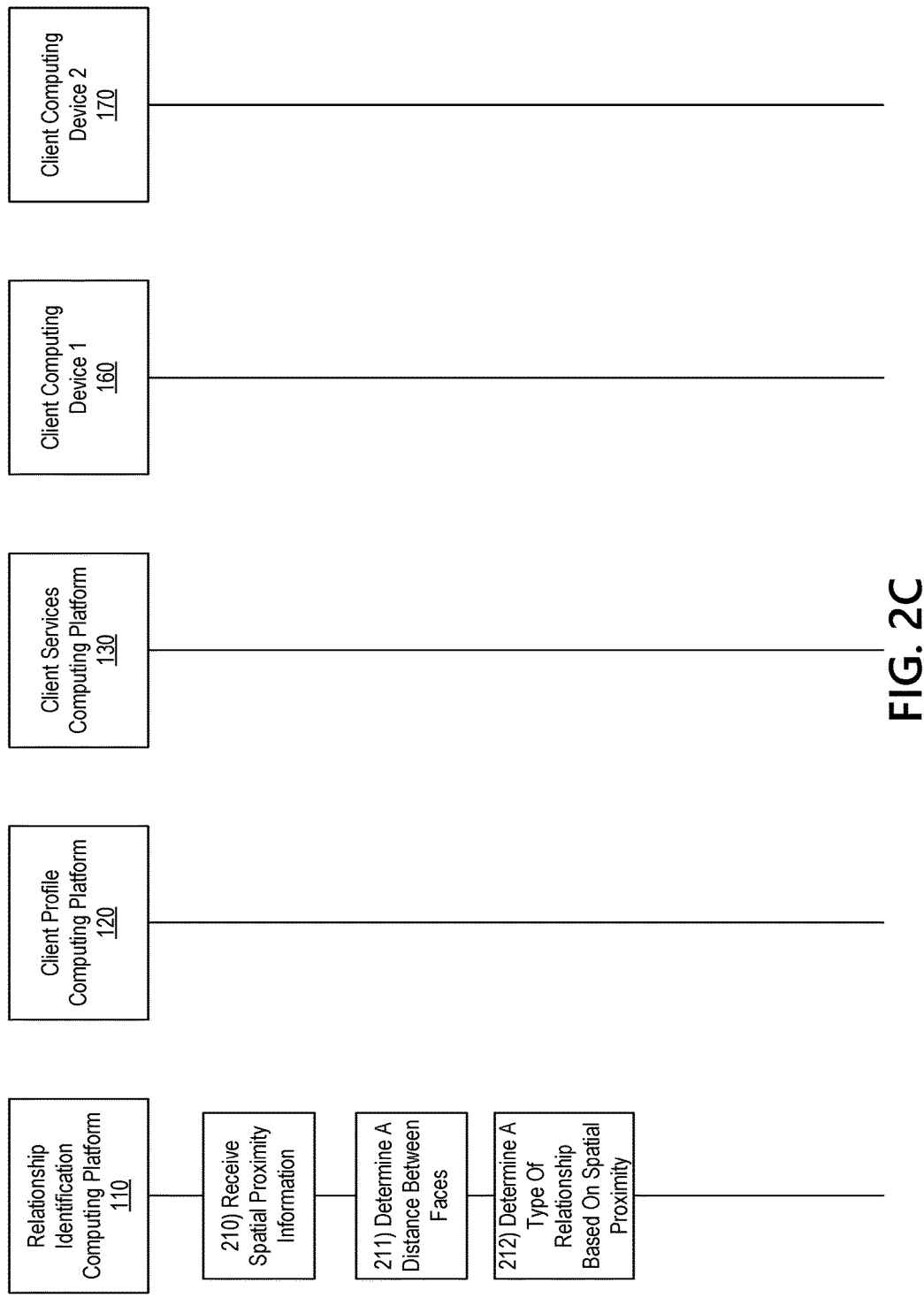

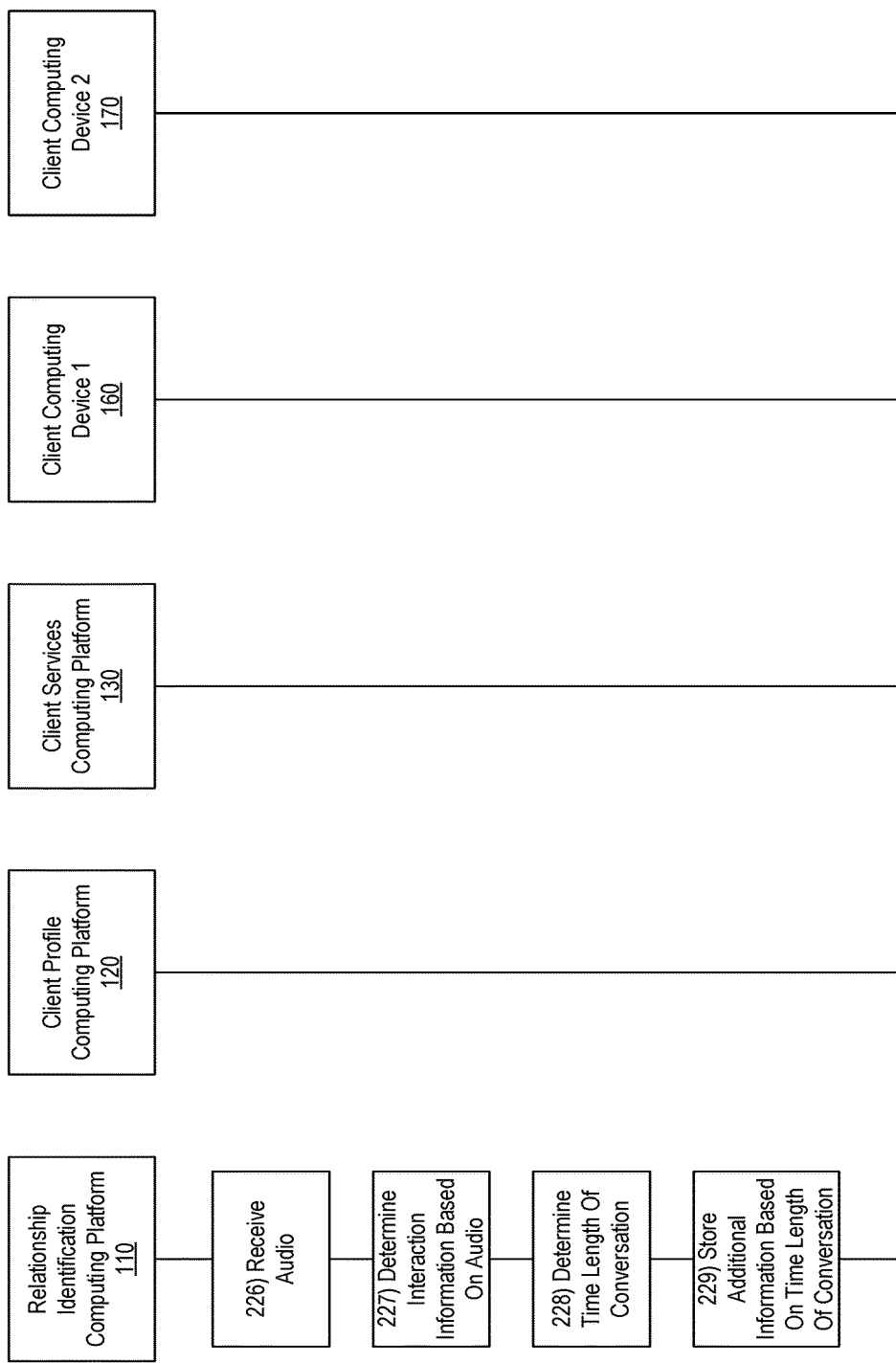

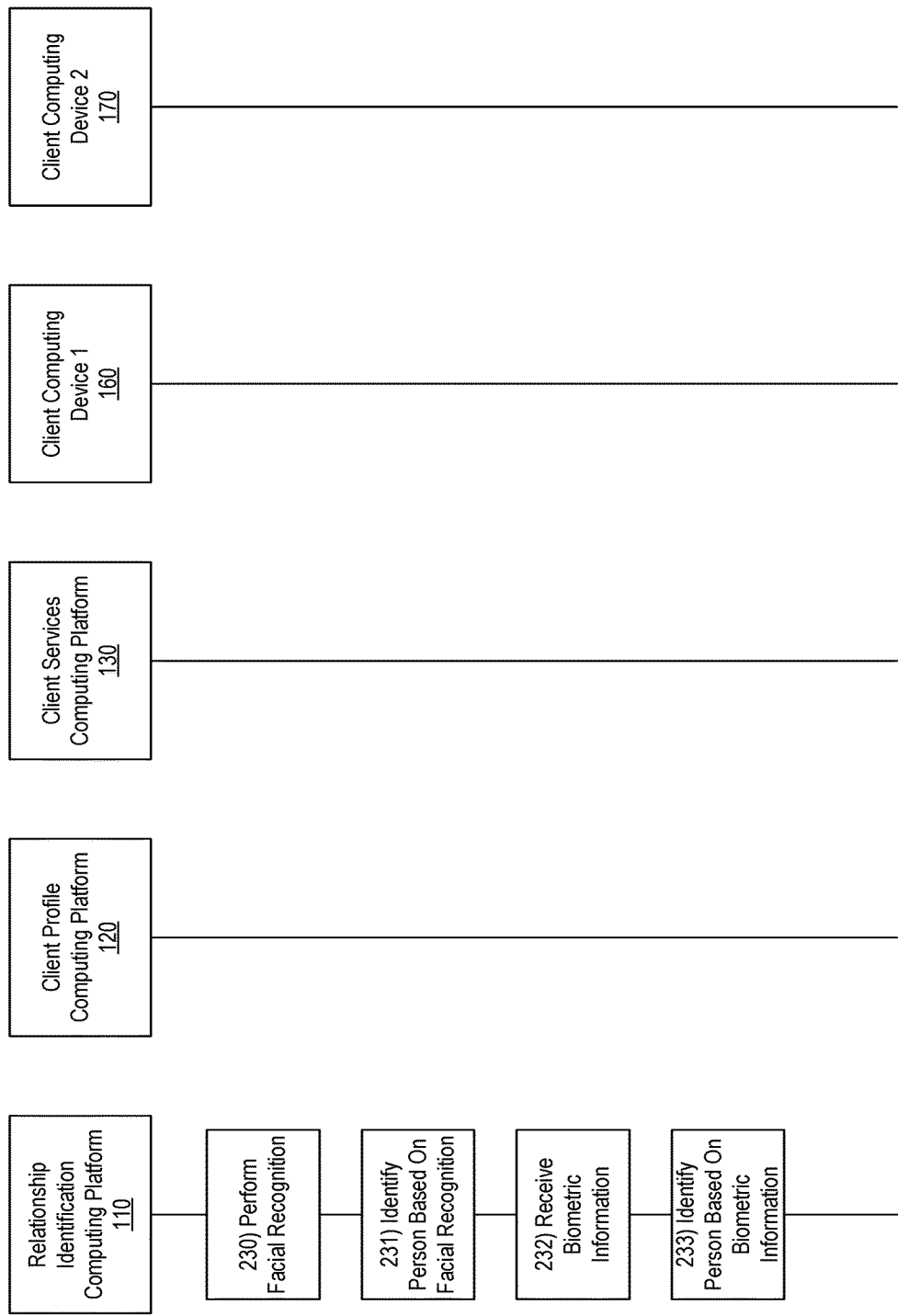

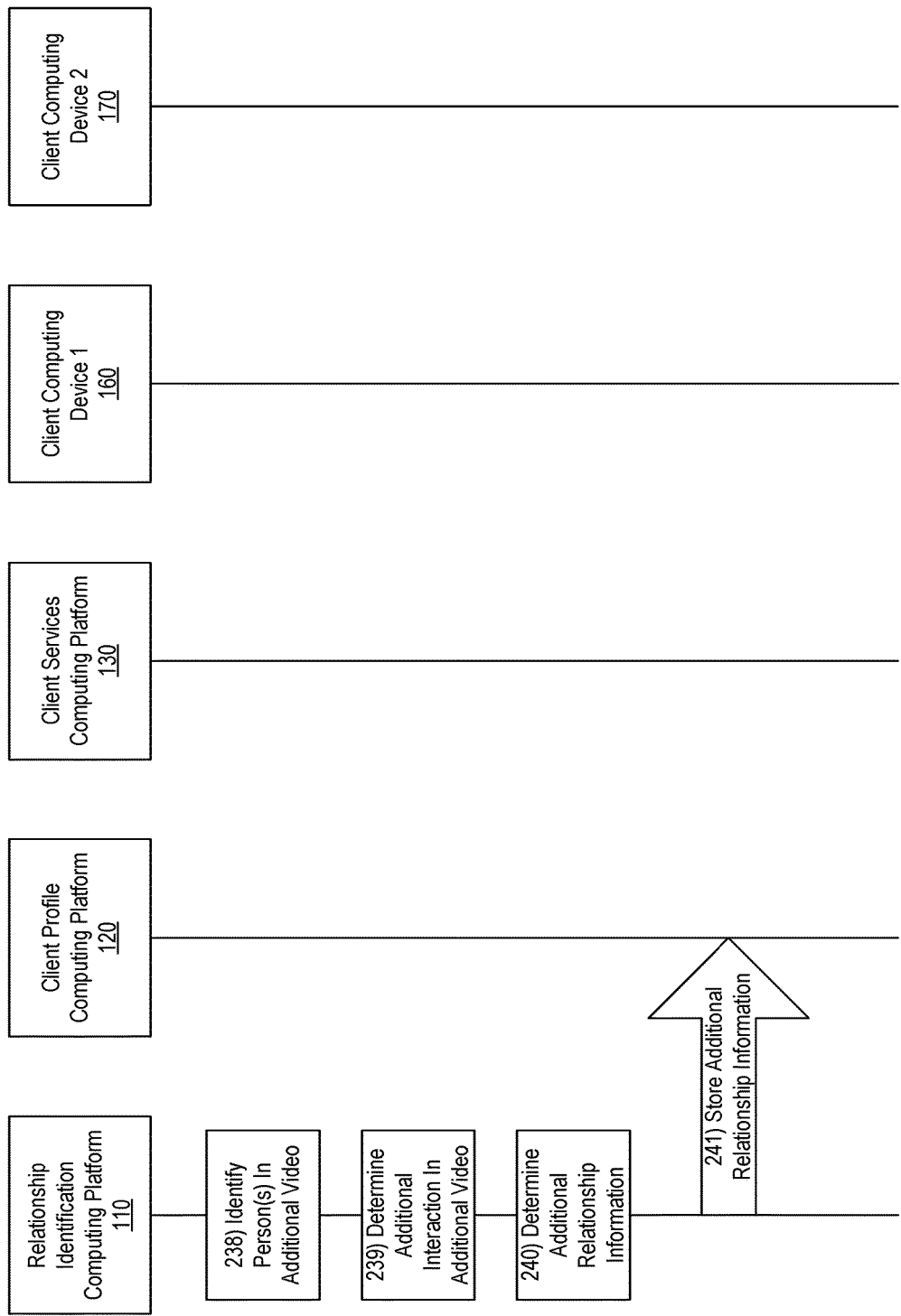

PERFORMING IMAGE ANALYSIS FOR DYNAMIC PERSONNEL IDENTIFICATION BASED ON A COMBINATION OF BIOMETRIC FEATURES

BACKGROUND

Businesses, organizations, and consumers increasingly deal with vast amounts of digital information, and therefore providing security for that digital information is also increasingly important. Companies and individuals have various methods of securing information, including using biometric identification techniques. To make the security process easier and more efficient, there will always be a need for an increasingly easy and convenient way to provide improved methods for identifying personnel based on biometric features, which will assist in securing information.

SUMMARY

Aspects of the disclosure provide effective, efficient, scalable, and convenient technical solutions that address and overcome the technical problems associated with personnel identification by implementing image analysis for dynamic personnel identification based on a combination of biometric features. Additional aspects of the disclosure relate to various systems and techniques that provide effective, efficient, scalable, and convenient ways of processing one or more biometric features for use in determining identities of personnel and relationships between those personnel.

In accordance with one or more embodiments, a computing platform having at least one processor, a memory, and a communication interface may receive, via the communication interface, video of a first person and a second person. The computing platform may identify the first person based on a user profile associated with the first person. The computing platform may determine, from the video, an interaction between the first person and the second person. The computing platform may determine, from the interaction between the first person and the second person, a relationship between the first person and the second person. The computing platform may store information relating to the relationship between the first person and the second person in the user profile associated with the first person. The computing platform may generate an electronic transmission describing an offer for a service to be provided to the second person, the service to be provided selected based on a same service being provided to the first person. The computing platform may send, to an electronic address associated with the second person, the electronic transmission describing the offer for the service to be provided to the second person.

In some embodiments, the computing platform may receive information identifying a spatial proximity between the first person and the second person. In some embodiments, the computing platform may, in a case that the spatial proximity between the first person and the second person is less than a threshold, determine that the relationship between the first person and the second person is a first type of relationship. In a case that the spatial proximity between the first person and the second person is greater than the threshold, the computing platform may determine that the relationship between the first person and the second person is a second type of relationship. In some embodiments, determining the spatial proximity between the first person and the second person may include determining a distance between a face of the first person and a face of the second person.

In some embodiments, determining, from the interaction between the first person and the second person, the relationship between the first person and the second person may include determining the relationship using a function with at least four parameters as inputs. In some embodiments, the at least four parameters may include a first measure of temporal proximity between the first person and the second person, a second measure of the spatial proximity between the first person and the second person, a third measure of the interaction between the first person and the second person, and/or a fourth measure of a facial closeness or facial expression between the first person and the second person. In some embodiments, determining the relationship using the function with the at least four parameters as inputs may include applying a weighting to each of the at least four parameters. In some embodiments, applying the weighting to each of the at least four parameters may include applying a non-zero weighting to a parameter of the at least four parameters if a measure of the parameter is above a weighting threshold, and/or applying a zero weighting to the parameter of the at least four parameters if the measure of the parameter is below the weighting threshold. In some embodiments, applying the weighting to each of the at least four parameters may be based on the information relating to the relationship between the first person and the second person stored in the user profile.

In some embodiments, the computing platform may store the information relating to the relationship between the first person and the second person in the user profile using an adjacency matrix. In some embodiments, the computing platform may use bipartite network clustering to adjust the information relating to the relationship between the first person and the second person stored in the user profile.

In some embodiments, determining, from the video, the interaction between the first person and the second person may include determining at least one of a gesture made by the first person to the second person, a gesture made by the second person to the first person, and/or a touch between the first person and the second person.

In some embodiments, the computing platform may receive audio of the interaction between the first person and the second person. The computing platform may determine, from the audio of the interaction between the first person and the second person, additional information about the interaction between the first person and the second person.

In some embodiments, the additional information about the interaction between the first person and the second person may include audio of a conversation between the first person and the second person. The computing platform may determine whether a time length of the conversation is greater than a conversation-time threshold. The computing platform may store additional information relating to the relationship between the first person and the second person in the user profile associated with the first person based on the time length of the conversation.

In some embodiments, the computing platform may perform facial recognition, using the video, to determine an identity of the second person. The computing platform may perform facial recognition, using the video, of the first person. In some embodiments, identifying the first person may be further based on performing the facial recognition of the first person.

In some embodiments, the computing platform may receive biometric information associated with the first person. In some embodiments, identifying the first person may be further based on the biometric information associated with the first person.

In some embodiments, the computing platform may receive location information of a mobile device associated with the first person. The computing platform may determine a location of the interaction between the first person and the second person. In some embodiments, identifying the first person may be further based on the location information of the mobile device associated with the first person corresponding with the location of the interaction between the first person and the second person.

In some embodiments, the computing platform may receive second video of the first person and the second person. The computing platform may identify the first person in the second video. The computing platform may identify the second person in the second video. The computing platform may determine, from the second video, a second interaction between the first person and the second person. The computing platform may determine, from the second interaction between the first person and the second person, additional information about the relationship between the first person and the second person. The computing platform may store the additional information about the relationship between the first person and the second person in the user profile associated with the first person.

In some embodiments, the computing platform may receive card usage information regarding a usage of a card associated with one of the first person and the second person at a time that the first person and the second person are within the spatial proximity. The computing platform may identify the one of the first person and the second person based on the card usage information.

In accordance with one or more embodiments, a method may include, at a computing platform having at least one processor, a memory, and a communication interface, receiving, via the communication interface, video of a first person and a second person. The method may include identifying the first person based on a user profile associated with the first person. The method may include determining, from the video, an interaction between the first person and the second person. The method may include determining, from the interaction between the first person and the second person, a relationship between the first person and the second person. The method may include storing information relating to the relationship between the first person and the second person in the user profile associated with the first person. The method may include generating an electronic transmission describing an offer for a service to be provided to the second person, the service to be provided selected based on a same service being provided to the first person. The method may include sending, to an electronic address associated with the second person, the electronic transmission describing the offer for the service to be provided to the second person.

In accordance with one or more embodiments, one or more non-transitory computer-readable media may store computer-readable instructions that, when executed by a computing platform having at least one processor, a memory, and a communication interface, may cause the computing platform to receive, via the communication interface, video of a first person and a second person. The computer-readable instructions, when executed by the computing platform, may further cause the computing platform to identify the first person based on a user profile associated with the first person. The computer-readable instructions, when executed by the computing platform, may further cause the computing platform to determine, from the video, an interaction between the first person and the second person. The computer-readable instructions, when executed by the computing platform, may further cause the computing platform to determine, from the interaction between the first person and the second person, a relationship between the first person and the second person. The computer-readable instructions, when executed by the computing platform, may further cause the computing platform to store information relating to the relationship between the first person and the second person in the user profile associated with the first person. The computer-readable instructions, when executed by the computing platform, may further cause the computing platform to generate an electronic transmission describing an offer for a service to be provided to the second person, the service to be provided selected based on a same service being provided to the first person. The computer-readable instructions, when executed by the computing platform, may further cause the computing platform to send, to an electronic address associated with the second person, the electronic transmission describing the offer for the service to be provided to the second person.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2K depict an illustrative event sequence for performing image analysis for dynamic personnel identification based on a combination of biometric features in accordance with one or more example embodiments;

DETAILED DESCRIPTION

Figure 1A:
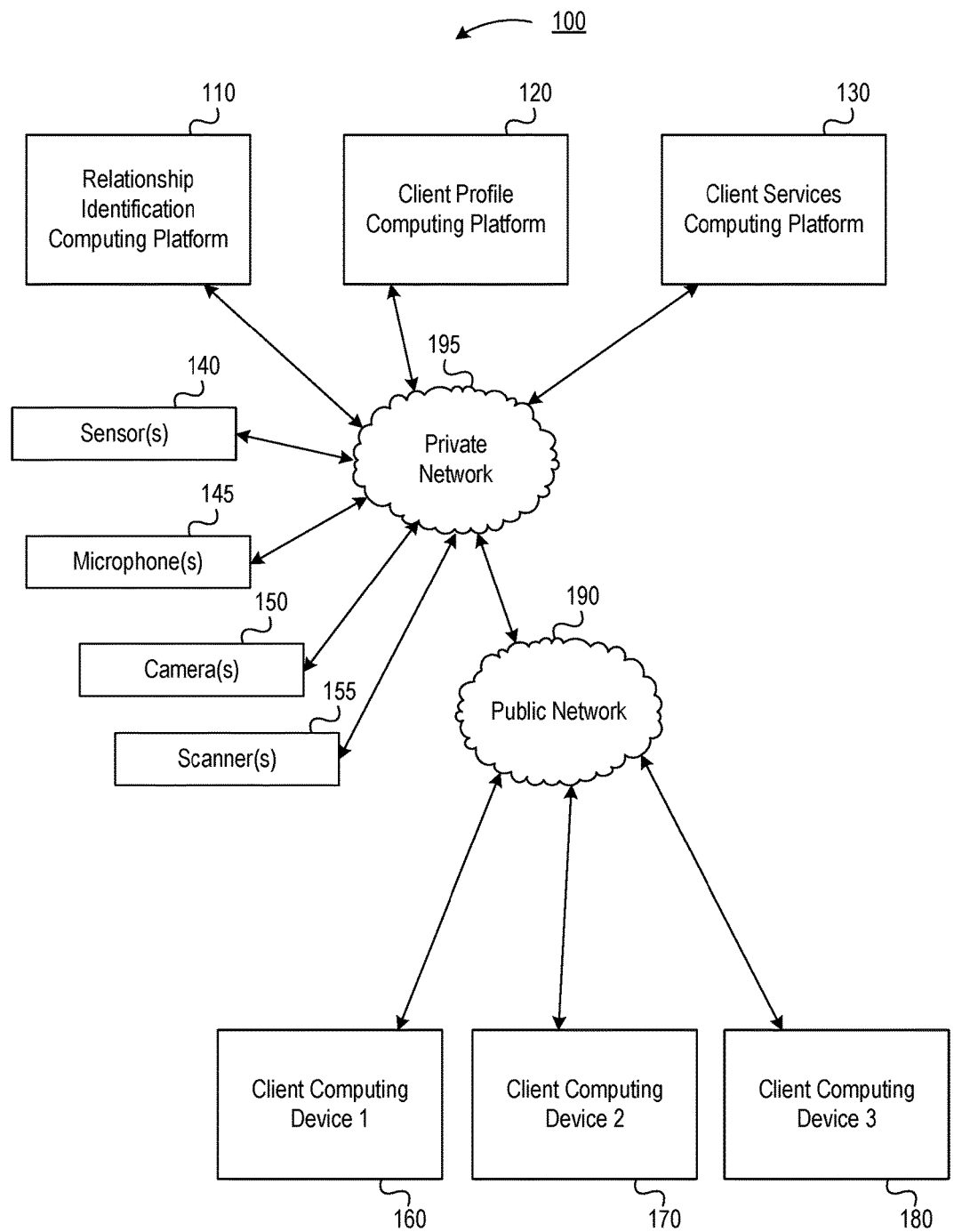
FIGS. 1A and 1B depict an illustrative computing environment for performing image analysis for dynamic personnel identification based on a combination of biometric features in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to understanding the social network of a customer (e.g., friends, family members, family structure, co-workers) to target products or services, and/or to predict future needs for the customer or for members of the customer's social network.

Some aspects may provide for using video footage to identify members of a customer's social network. For example, a computing system may associate video of the customer with the customer's account data. The video may be of the customer in a retail location (or other physical location). The system may determine a timestamp for a customer interaction with a retail system, associate, or the like, and link the interaction with the video of the customer with the customer interaction. In some aspects, the system may identify other users in close physical or temporal proximity to the customer, and establish an initial weakly-weighted link between the customer and other users. Over time, the system may observe recurring associations between the customer and other users, and may strength weights between those users to establish high-confidence relationships. If the linked individuals (e.g., the other users) are also customers, their account data can be associated and linked to the customer (e.g., a relationship identifier can be added to each account or profile). If the linked individuals are not customers, or have an unknown status, basic information about the individual can be collected and stored (e.g., the individual appears to be a child, and the customer may be a parent or caregiver).

In some aspects, beacons, sensors, and/or Internet-of-things technology may be leveraged to identify the social network of the customer based on interactions at other locations (e.g., merchant partners, other locations, and the like), so that the partners may also benefit from increased information.

Thus, according to some aspects, the system may provide for creating and re-enforcing a social network based on video data, individual transactions, spatial proximity of related individuals, and/or temporal proximity of related individuals. The system may link certain known users (e.g., customers) to their account profile at a time a transaction is performed and use that customer as an anchor from which to identify, build, and/or expand a social network.

Figure 1B:
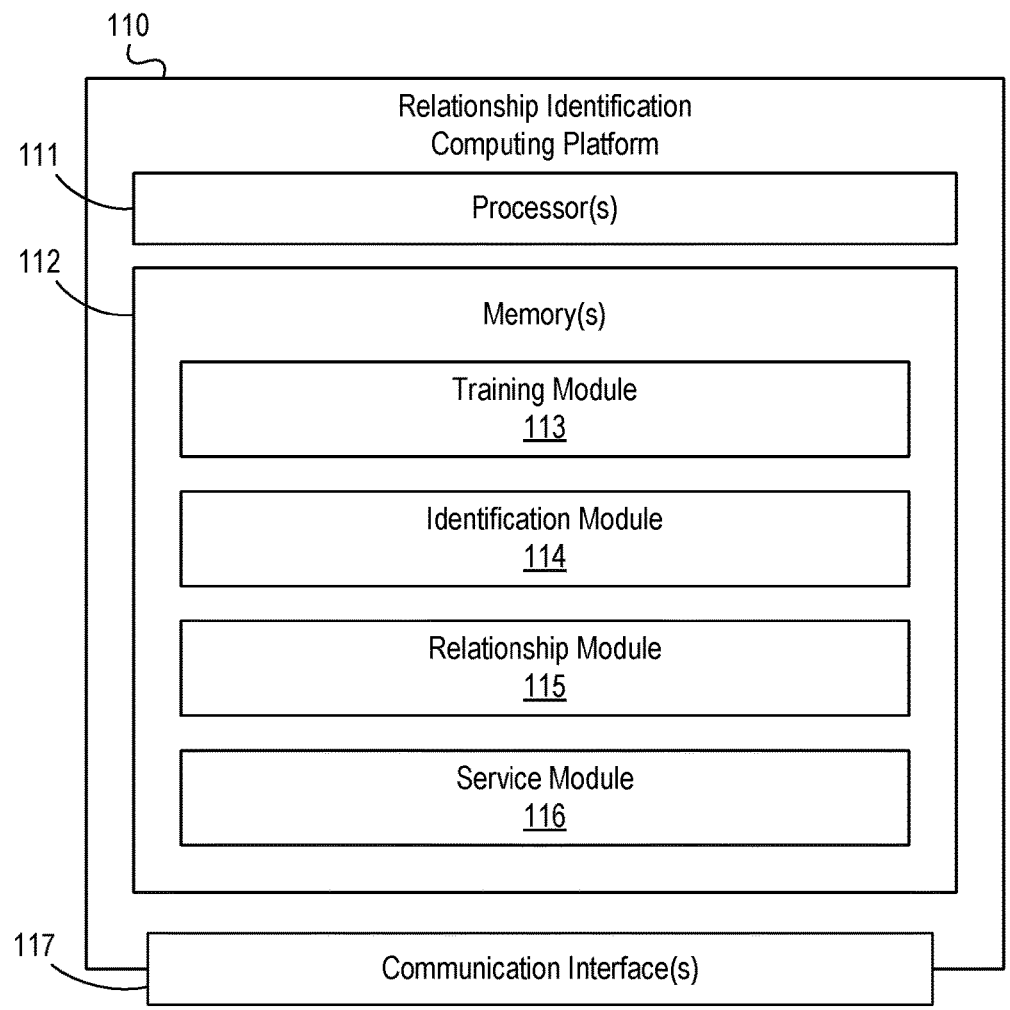

FIGS. 1A and 1B depict an illustrative computing environment for performing image analysis for dynamic personnel identification based on a combination of biometric features in accordance with one or more example embodiments. Referring to FIG. 1A, computing environment 100 may include one or more computing devices. For example, computing environment 100 may include a relationship identification computing platform 110, a client profile computing platform 120, a client services computing platform 130, a first client computing device 160, a second client computing device 170, and a third client computing device 180.

Relationship identification computing platform 110 may be configured to receive information (e.g., video, audio, biometric information, card information, profile information, and the like) related to one or more individuals (who may, e.g., be customers or non-customers of an organization), as illustrated in greater detail below. Relationship identification computing platform 110 may be further configured to identify the one or more individuals, as well as identify relationships between the individuals, as illustrated in greater detail below. Relationship identification computing platform 110 may be configured to create, update, and delete stored relationship information based on additional information received about a relationship between individuals, as illustrated in greater detail below. Relationship identification computing platform 110 may, together with client profile computing platform 120 and/or client services computing platform 130, enable an organization to provide enhanced services to customers and non-customers of an organization.

Client profile computing platform 120 may be configured to store, update, and/or provide services for interacting with one or more client profiles. For example, client profile computing platform 120 may be configured to provide a customer portal, such as an online banking portal, to one or more customers of an organization, such as a financial institution, who may use one or more client computing devices to access the portal, such as client computing device 160, client computing device 170, and client computing device 180, as illustrated in greater detail below. In some instances, in addition to being configured to provide an online banking portal associated with a financial institution to one or more customers of the financial institution and/or their associated computing devices, client profile computing platform 120 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like). These portals may allow a customer to access, review, update, accept, reject, delete, or modify identification information, relationship information, social network information, and the like.

Client services computing platform 130 may be configured to identify one or more services that may be useful to customers or non-customers (e.g., people in social networks of customers). Client services computing platform 130 may generate and/or send transmissions with information, details, and offers for providing the one or more services to customers or non-customers. For example, client services computing platform 130 may include and/or integrate with one or more client support servers and/or devices, such as one or more customer service representative devices used by one or more customer service representatives of an organization (e.g., be a financial institution operating client profile computing platform 120), to connect one or more customers of the organization with one or more customer service representatives of the organization to provide additional information about the services available to the customers or non-customers.

Client computing device 160 may be configured to be used by a first customer of an organization, such as a financial institution. In some instances, client computing device 160 may, for example, be registered with the organization and/or one or more computer systems in computing environment 100, such that the organization and/or the one or more computer systems maintain one or more records linking client computing device 160 to the first customer of the organization, as illustrated in greater detail below. Client computing device 170 may be configured to be used by a second customer of the organization (who may, e.g., be different from the first customer of the organization). In some instances, client computing device 170 may, for example, be registered with the organization and/or one or more computer systems in computing environment 100, such that the organization and/or the one or more computer systems maintain one or more records linking client computing device 170 to the second customer of the organization, as illustrated in greater detail below. Client computing device 180 may be configured to be used by a third customer of the organization (who may, e.g., be different from the first customer of the organization and the second customer of the organization). In some instances, client computing device 180 may, for example, be registered with the organization and/or one or more computer systems in computing environment 100, such that the organization and/or the one or more computer systems maintain one or more records linking client computing device 180 to the third customer of the organization, as illustrated in greater detail below.

In one or more arrangements, relationship identification computing platform 110, client profile computing platform 120, client services computing platform 130, client computing device 160, client computing device 170, and client computing device 180 may be any type of computing device capable of receiving a user interface, receiving input via the user interface, and communicating the received input to one or more other computing devices. For example, client profile computing platform 120, client services computing platform 130, client computing device 160, client computing device 170, and client computing device 180 may, in some instances, be and/or include server computers, server blades, desktop computers, laptop computers, tablet computers, smart phones, or the like that may include one or more processors, memories, communication interfaces, storage devices, and/or other components. As noted above, and as illustrated in greater detail below, any and/or all of client profile computing platform 120, client services computing platform 130, client computing device 160, client computing device 170, and client computing device 180 may, in some instances, be special-purpose computing devices configured to perform specific functions.

Computing environment 100 also may include one or more devices for gathering information for use by one or more of relationship identification computing platform 110, client profile computing platform 120, and client services computing platform 130. For example, computing environment 100 may include one or more sensor(s) 140, one or more microphone(s) 145, one or more camera(s) 150, one or more scanner(s) 155, and/or additional information-gathering devices (e.g., hardware or software). Computing environment 100 may include one or more processors, microprocessors, computers, microcomputers, circuits, and/or other hardware for gathering, storing, processing, converting, or otherwise enabling one or more sensor(s) 140, one or more microphone(s) 145, one or more camera(s) 150, one or more scanner(s) 155, and/or additional information-gathering devices in computing environment 100.

Computing environment 100 also may include one or more networks, which may interconnect one or more of relationship identification computing platform 110, client profile computing platform 120, client services computing platform 130, one or more sensor(s) 140, one or more microphone(s) 145, one or more camera(s) 150, one or more scanner(s) 155, client computing device 160, client computing device 170, and client computing device 180. For example, computing environment 100 may include public network 190 and private network 195. Private network 195 and/or public network 190 may include one or more subnetworks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, relationship identification computing platform 110, client profile computing platform 120, and client services computing platform 130 may be associated with an organization (e.g., a financial institution), and private network 195 may be associated with and/or operated by the organization, and may include one or more networks (e.g., LANs, WANs, virtual private networks (VPNs), or the like) that interconnect relationship identification computing platform 110, client profile computing platform 120, and client services computing platform 130 and one or more other computing devices and/or computer systems that are used by, operated by, and/or otherwise associated with the organization. Public network 190 may connect private network 195 and/or one or more computing devices connected thereto (e.g., relationship identification computing platform 110, client profile computing platform 120, and client services computing platform 130) with one or more networks and/or computing devices that are not associated with the organization. For example, client computing device 160, client computing device 170, and client computing device 180 might not be associated with an organization that operates private network 195 (e.g., because client computing device 160, client computing device 170, and client computing device 180 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect client computing device 160, client computing device 170, and client computing device 180 to private network 195 and/or one or more computing devices connected thereto (e.g., relationship identification computing platform 110, client profile computing platform 120, and client services computing platform 130).

Referring to FIG. 1B, relationship identification computing platform 110 may include one or more processors 111, memory 112, and communication interface 117. A data bus may interconnect processor(s) 111, memory 112, and communication interface 117. Communication interface 117 may be a network interface configured to support communication between relationship identification computing platform 110 and one or more networks (e.g., private network 195, public network 190, or the like). Memory 112 may include one or more program modules having instructions that when executed by processor(s) 111 cause relationship identification computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of relationship identification computing platform 110 and/or by different computing devices that may form and/or otherwise make up relationship identification computing platform 110. For example, memory 112 may have, store, and/or include a training module 113, an identification module 114, a relationship module 115, and a service module 116. Training module 113 may have instructions that direct and/or cause relationship identification computing platform 110 to train (e.g., machine-learning training) one or more computing devices to identify users based on one or more features (e.g., face, gender, age group, gestures) and/or to perform other functions, as discussed in greater detail below. Identification module 114 may have instructions that direct and/or cause relationship identification computing platform 110 to identify users based on one or more features and/or to perform other functions, as discussed in greater detail below. Relationship module 115 may have instructions that direct and/or cause relationship identification computing platform 110 to determine a relationship between two or more individuals and/or to perform other functions, as discussed in greater detail below. Service module 116 may have instructions that direct and/or cause relationship identification computing platform 110 to identify and/or or offer one or more services to one or more individuals and/or to perform other functions, as discussed in greater detail below.

Figure 2A:
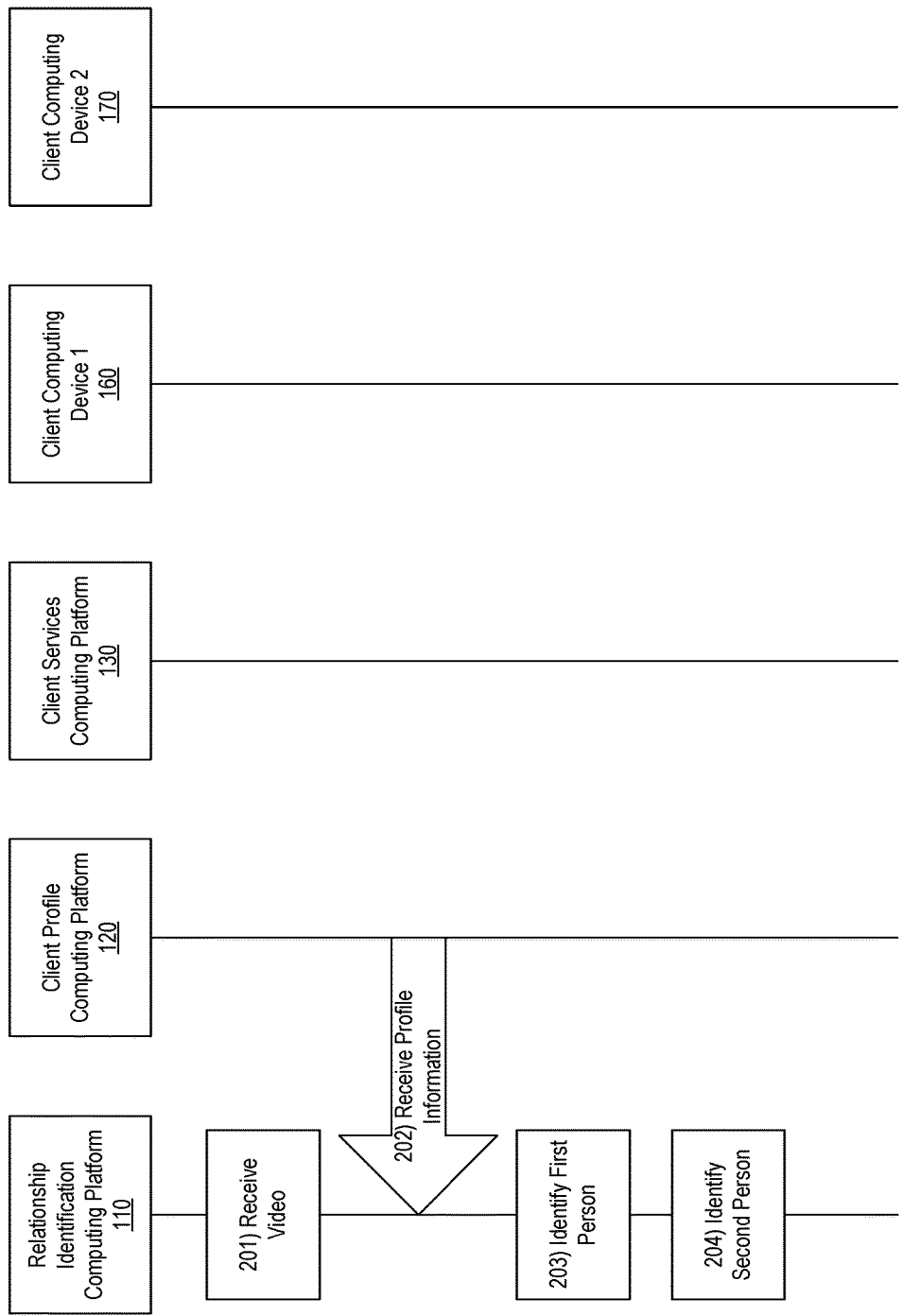

FIGS. 2A-2N depict an illustrative event sequence for performing image analysis for dynamic personnel identification based on a combination of biometric features in accordance with one or more example embodiments. Referring to FIG. 2A, at step 201, relationship identification computing platform 110 may receive video. For example, the video may be video of one or more people (e.g., a first person and a second person). The video may be from a retail location (e.g., inside a store, inside a retail banking location, inside a restaurant). At step 202, relationship identification computing platform 110 may receive profile information. For example, relationship identification computing platform 110 may receive profile information for a first person and a second person (e.g., the first person and/or the second person in the video). Relationship identification computing platform 110 may be connected to one or more other computing devices (e.g., client profile computing platform 120), which may, for example, include one or more databases, tables, or other data structures for storing profile information. The stored profile information may include information about one or more biometric features (e.g., facial images, body images, fingerprint, iris images, retinal images, palm veins, palm print, hand geometry, and the like).

At step 203 and step 204, relationship identification computing platform 110 may identify, based on the received profile information, one or more people in the video. For example, at step 203, relationship identification computing platform 110 may identify the first person. At step 204, relationship identification computing platform 110 may identify the second person. If there are additional people in the video, relationship identification computing platform 110 may perform additional steps (not pictured) of identifying the additional people in the video. Relationship identification computing platform 110 may identify the one or more people in the video by comparing biometric features of the people in the video to the biometric features stored in the profile information (e.g., on client profile computing platform 120).

Referring to FIG. 2B, at step 205, relationship identification computing platform 110 may determine, from the video, an interaction between the first person and the second person. For example, an interaction may include a gesture, a conversation, a look, a facial expression, a touch, or the like. As another example, two or more individuals may be waiting in line together, and may engage in a number of interactions during a period of waiting, such as talking with each other, standing near each other, looking at each other, and the like.

At step 206, relationship identification computing platform 110 may determine, from the interaction between the first person and the second person, a relationship between the first person and the second person. For example, if a first person appears to be an adult, and a second person appears to be a child, and one or more interactions between the first person and second person are consistent with the adult taking care of the child (e.g., holding hand, speaking to each other, standing in line together, the adult handing food or other items to the child, or the like), a relationship between the adult and the child may be identified as being a potential parent-child, aunt/uncle-niece/nephew, or caretaker-child relationship. As another example, if two people interacting appear to be adults, with a similar style of dress, and are interacting in a professional manner (e.g., standing near each other carrying on a conversation, nodding while listening, and the like), a relationship between the two people may be identified as a co-worker or professional relationship.

At step 207, relationship identification computing platform 110 may store information relating to the relationship between the first person and the second person in the user profile associated with the first person and/or in the user profile associated with the second person. For example, a user profile associated with the first person may store information about one or more relationships of the first person. Similarly, a user profile associated with the second person may store information about one or more relationships of the second person. Information about one or more relationships may include information about each person with whom a person with whom the user profile is associated has or may have a relationship. For example, the user profile may include information about one or more confirmed relationships, which may include information on relationships that have been confirmed (e.g., through multiple observed interactions, by confirmation by one or both people in the relationship). The user profile alternatively or additionally may include one or more possible relationships, which may include information about relationships that have been identified (e.g., based on one or more observed interactions), but not confirmed. The information stored in the user profile of the first person and/or in the user profile of the second person may be updated to include the information relating to the relationship between the first person and the second person. Specifically, if there is not any information about a relationship between the first person and the second person, a new potential relationship may be added, and information about the observed interaction may be stored in connection with the new potential relationship. If the user profile already includes information about the relationship between the first person and the second person (e.g., as a potential relationship or as a confirmed relationship), the information about the relationship between the first person and the second person may be updated to include the additional information. For example, a weighting of the relationship may be updated to be strengthened, based on the observed additional interaction between the first person and the second person.

At step 208, client services computing platform 130 may generate an electronic transmission describing an offer for a service to be provided to the second person, the service to be provided selected based on a same service being provided to the first person. For example, a first person may have access to, a subscription to, or otherwise participate in or partake of a particular service (e.g., a digital service, a home service, an account with a particular service provider, a bank account, a feature of a bank account, a loan, a credit card, a debit card, a gym membership, a philanthropic account, a streaming video service, a streaming audio service, a cleaning service, a lawn-care service, a delivery service, or the like). Client services computing platform 130 may identify one or more people with whom the first person receiving the particular service has a relationship for whom the service may be of interest. For example, if the first person and the one or more people share a particular trait (e.g., demographic, interest, profession, income, neighborhood, family characteristic, or the like), the identified one or more people may also be interested in the particular service that the first person is receiving. As another example, the identified one or more people may have a relationship with the first person that provides additional information about a type of service that the identified one or more people might be interested in that might be different from the particular service that the first person receives. For example, if the identified one or more people are children of the first person, the children might be interested in a savings account, an education account, or the like, even if the first person (e.g., a parent, caregiver, aunt, uncle, grandparent, or the like) might not receive the identified service.

At step 209, client services computing platform 130 may send, to an electronic address associated with the second person, the electronic transmission describing the offer for the service to be provided to the second person. The electronic transmission may include one or more details about the service, a link to sign up for the service, referral information, or the like. For example, the electronic transmission may include information about the relationship between the first person and the second person (e.g., "this offer is because you have a relationship with" the first person).

In some embodiments, client services computing platform 130 may generate and/or send an electronic transmission to an electronic address associated with the first person, the electronic transmission including a description of an offer for an additional service to be provided to the first person based on one or more identified relationships of the first person. For example, if a spouse or significant other of the first person is identified, the offer may be to add the identified spouse or significant other as an authorized user of one or more services received by the first person (e.g., a streaming account, a shopping account, a bank account, or the like). As another example, if a child of the first person is identified, the offer may be to create a custodial account on behalf of the child.

Referring to FIG. 2C, at step 210, relationship identification computing platform 110 may receive information identifying a spatial proximity between the first person and the second person. For example, identifying a spatial proximity between the first person and the second person may include identifying a distance between a body of the first person and a body of the second person, a distance between a face of the first person and a face of the second person (e.g., as determined by relationship identification computing platform 110 in step 211), or the like. At step 212, based on the spatial proximity between the first person and the second person, relationship identification computing platform 110 may identify additional information about a relationship between the first person and the second person. Specifically, in a case that the spatial proximity between the first person and the second person is less than a threshold, determine that the relationship between the first person and the second person is a first type of relationship. In a case that the spatial proximity between the first person and the second person is greater than the threshold, determine that the relationship between the first person and the second person is a second type of relationship. For example, if there are several feet between the first person and the second person in a video for the course of the video, relationship identification computing platform 110 may determine that the relationship is a more distant relationship than if there is no space between the first person and the second person (e.g., touching, holding hands, hugging, leaning on each other) or little space (e.g., standing very close together, leaning in).

Figure 2D:
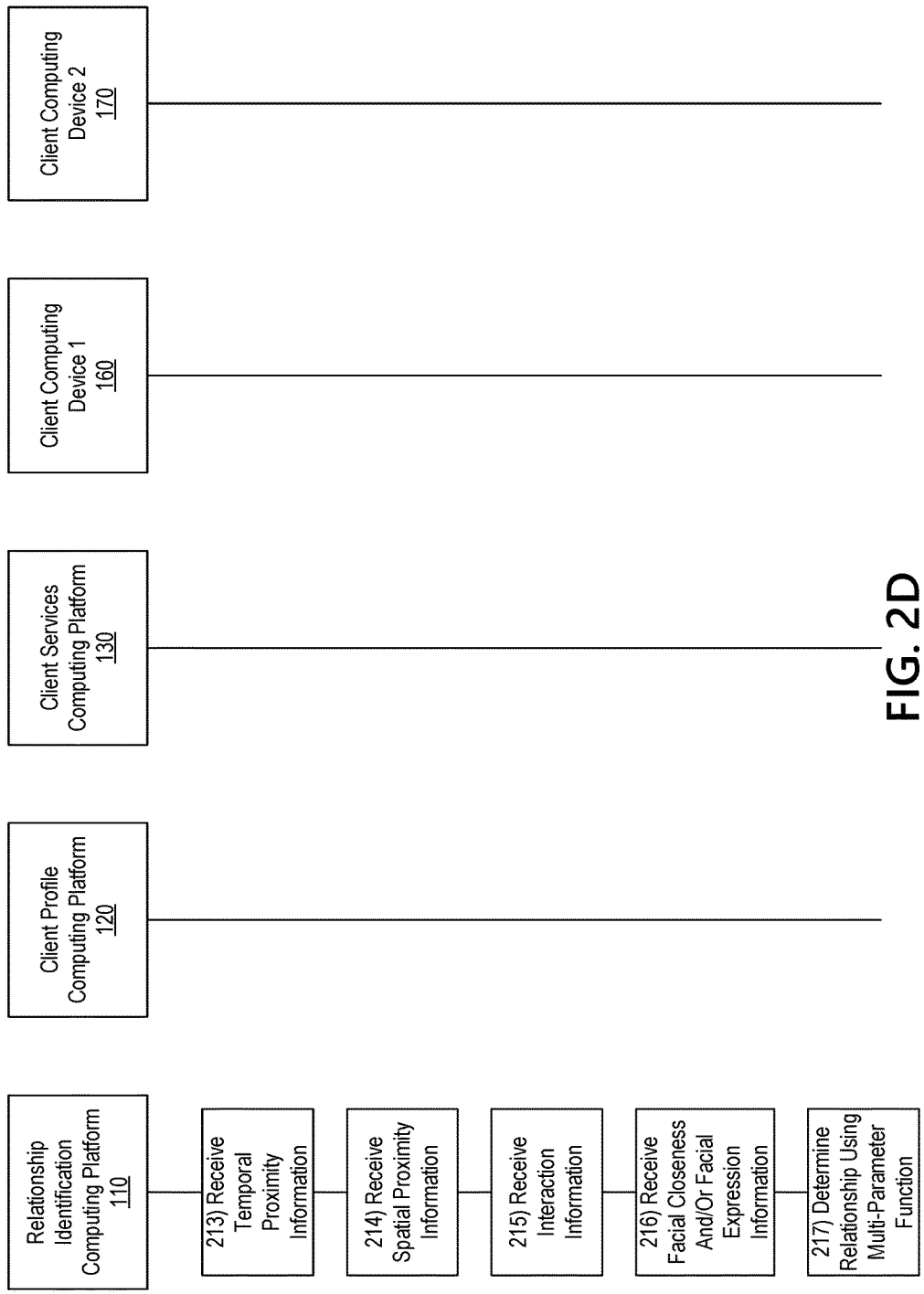

Referring to FIG. 2D, at step 213, relationship identification computing platform 110 may receive a measure of temporal proximity between the first person and the second person. Temporal proximity may include a closeness in time between the first person and the second person relative to a particular location. For example, if two people are at a retail location at a same time, even if not in an identical location within the retail location (e.g., the two people are standing next to each other in line and talking together as they move through the line), they may be identified as having a close temporal proximity. Alternatively, if two people are at a same retail location, but one arrives after the other one leaves, the two people may be identified as not having a close temporal proximity.

At step 214, relationship identification computing platform 110 may receive additional spatial proximity information about the spatial proximity between the first person and the second person. This spatial proximity information may be similar to the spatial proximity information received earlier (as discussed in connection with step 210). The additional spatial proximity information may be based on a different source (e.g., a different video, a sensor, microphone, and/or the like) than the spatial proximity information received earlier. Relationship identification computing platform 110 may determine a measure for the spatial proximity information and/or the additional spatial proximity information.

At step 215, relationship identification computing platform 110 may receive a measure of the interaction (e.g., a gesture) between the first person and the second person. For example, a type, a count (e.g., how many times the gesture was repeated), a degree of intensity, a length of time the interaction lasted, or other information about the interaction may be identified. In some embodiments, each particular gesture, word, touch, or other interaction may be separately identified and processed. Alternatively, a number of gestures, words, conversations, touches, or other discrete interactions that occur within a particular temporal proximity and/or spatial proximity may be identified as part of a same interaction (e.g., the first person's visit to a particular location on a particular day at a particular time while accompanied by a particular person).

At step 216, relationship identification computing platform 110 may receive a measure of a facial closeness or facial expression between the first person and the second person. The measure of facial closeness may be a distance (e.g., a number of millimeters, centimeters, meters, inches, feet, yards) or range of distances. Alternatively or additionally, the measure of facial closeness may be determined to be in a particular category (e.g., very close, intimate, close, friendly, arms-length, professional, distant, acquaintances), which may be based on the distance or range of distances.

The measure of facial expression may be an identification of a type of facial expression (e.g., smile, frown, laugh, raised eyebrow, scrunched face, pursed lips, anger, sadness, confusion, love, affection, or the like). The type of facial expression may be identified based on one or more movements or changes to one or more facial features, muscles, or the like, which may be processed based on one or more stored rules for identifying and classifying facial expressions.

At step 217, relationship identification computing platform 110 may determine information about the relationship between the first person and the second person using a function with one or more parameters as inputs. For example, the function may include one parameter, two parameters, three parameters, four parameters, five parameters, six parameters, or more parameters. For example, the parameters may include one or more of the measure of the temporal proximity between the first person and the second person, the measure of the spatial proximity between the first person and the second person, the measure of the interaction (e.g., a gesture) between the first person and the second person, and/or the measure of the facial closeness or facial expression between the first person and the second person. Thus, the function may be written as $f(P_t, P_s, P_g, P_f)$, where $P_t$ represents the measure of the temporal proximity between the first person and the second person, where $P_s$ represents the measure of the spatial proximity between the first person and the second person, where $P_g$ represents the measure of the interaction (e.g., a gesture) between the first person and the second person, and where $P_f$ represents the measure of the facial closeness or facial expression between the first person and the second person.

Figure 2E:
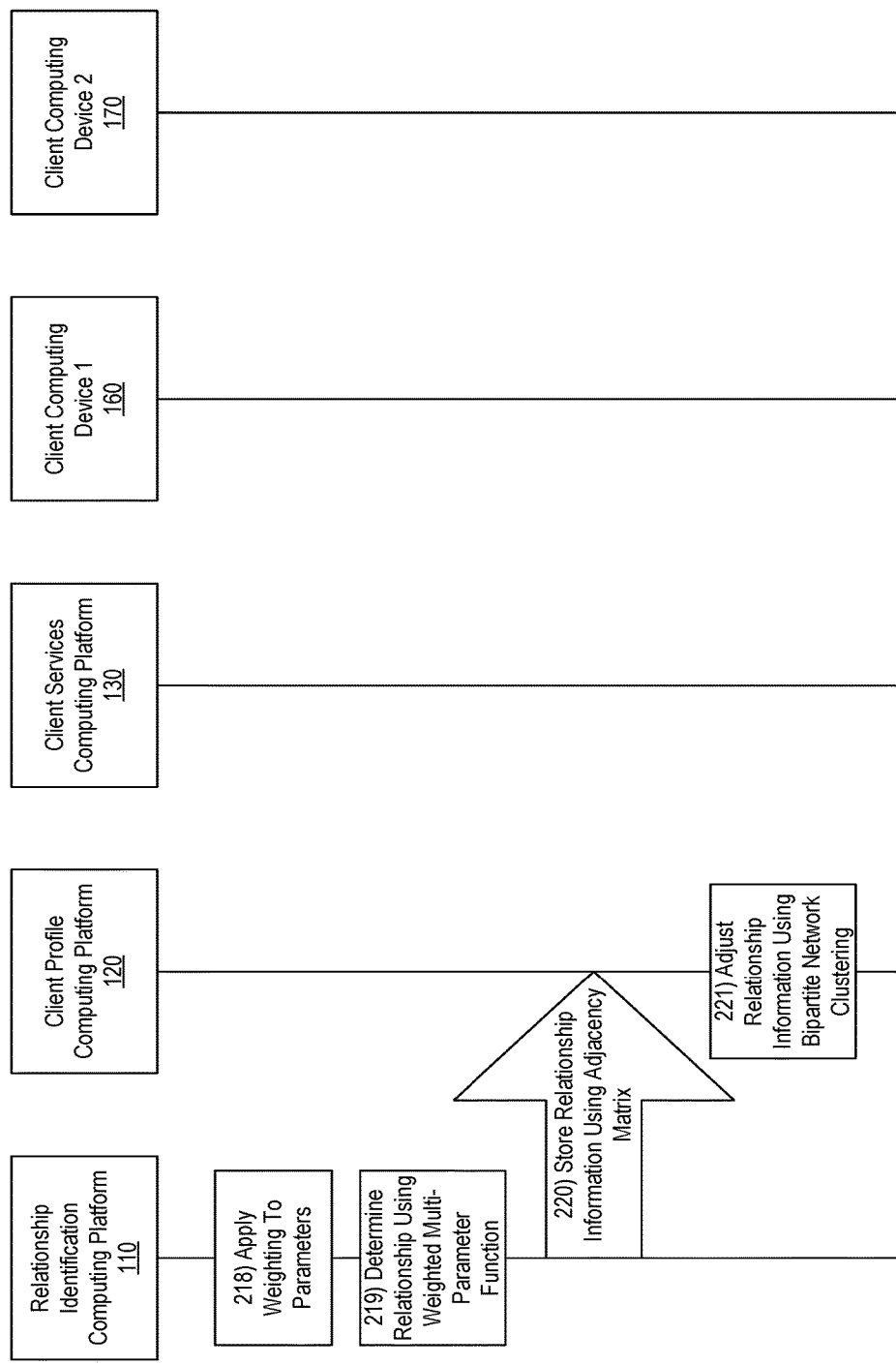

Referring to FIG. 2E, at step 218, relationship identification computing platform 110 may apply a weighting to one or more of the parameters used in a relationship function. For example, applying the weighting to the parameters may include applying a non-zero weighting to a parameter if a measure of the parameter is above a weighting threshold, and applying a zero weighting to the parameter if the measure of the parameter is below the weighting threshold. Furthermore, applying the weighting to the parameters may be based on information relating to the relationship between the first person and the second person stored in the user profile of the first person and/or the user profile of the second person. At step 219, relationship identification computing platform 110 may determine additional information about a relationship using the weighted parameter(s) in a multi-parameter function. The function may be written as Relationship $(P_1, P_2, P_3 \ldots P_n)$, where $P_1$ represents the first weighted parameter, where $P_2$ represents the second weighted parameter, where $P_3$ represents the third weighted parameter, and where $P_n$ represents the nth weighted parameter.

Over time, weights between recurring associations may be strengthened to establish high-confidence relationships. For example, if two individuals frequently appear together (e.g., within spatial proximity and/or temporal proximity), have facial closeness, and/or have gestures or other interactions, the repeated observation and identification of the interactions between these individuals may result in an increasingly highly-weighted relationship between the two individuals.

At step 220, relationship identification computing platform 110 may store the information relating to the relationship between the first person and the second person in the user profile of the first person and/or the relationship of the second person. In some aspects, the association relationship values may be stored in adjacency matrix form.

At step 221, client profile computing platform 120 may use bipartite network clustering to adjust the information relating to the relationship between the first person and the second person stored in the user profile.

Figure 2F:
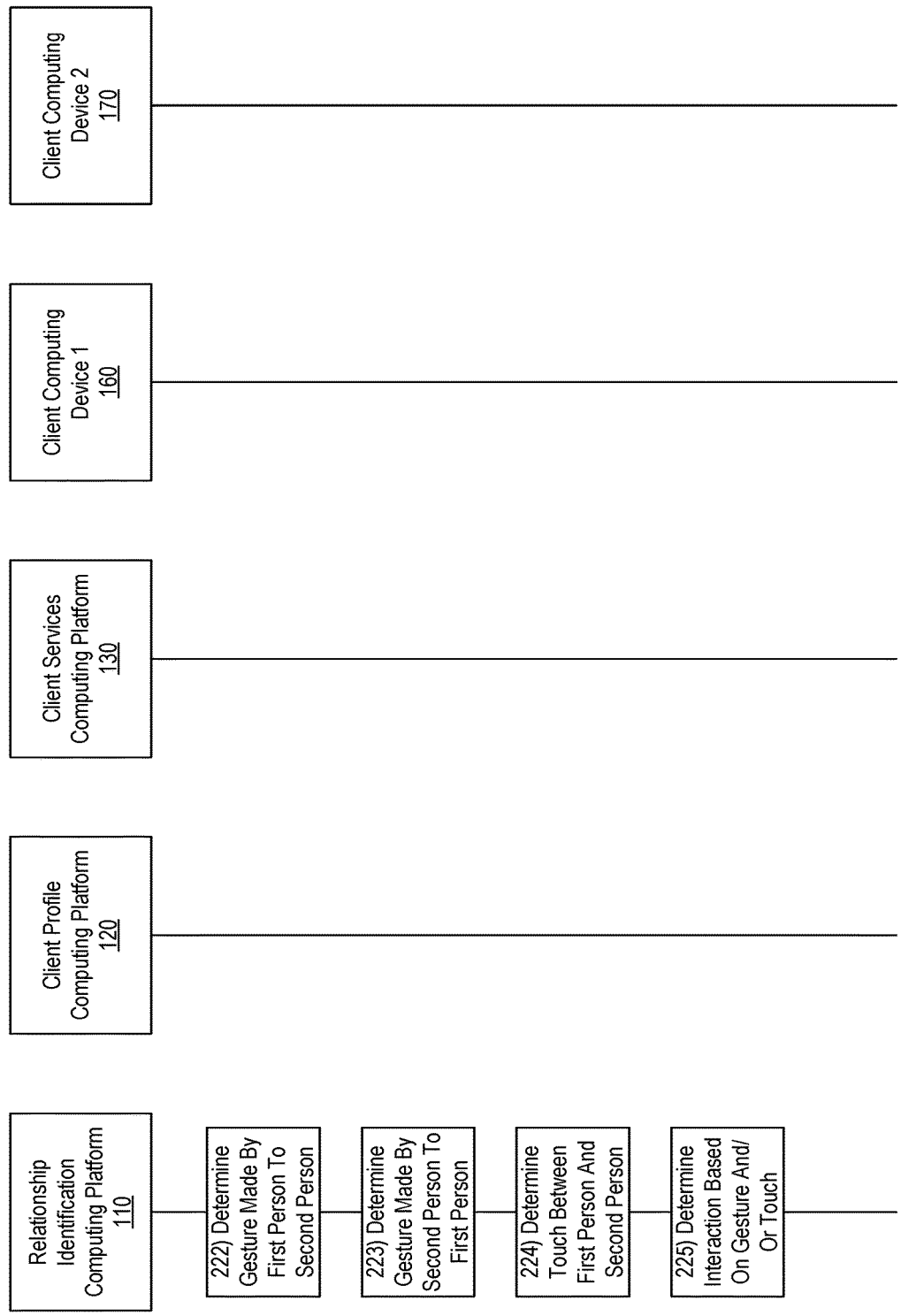
Figure 21:
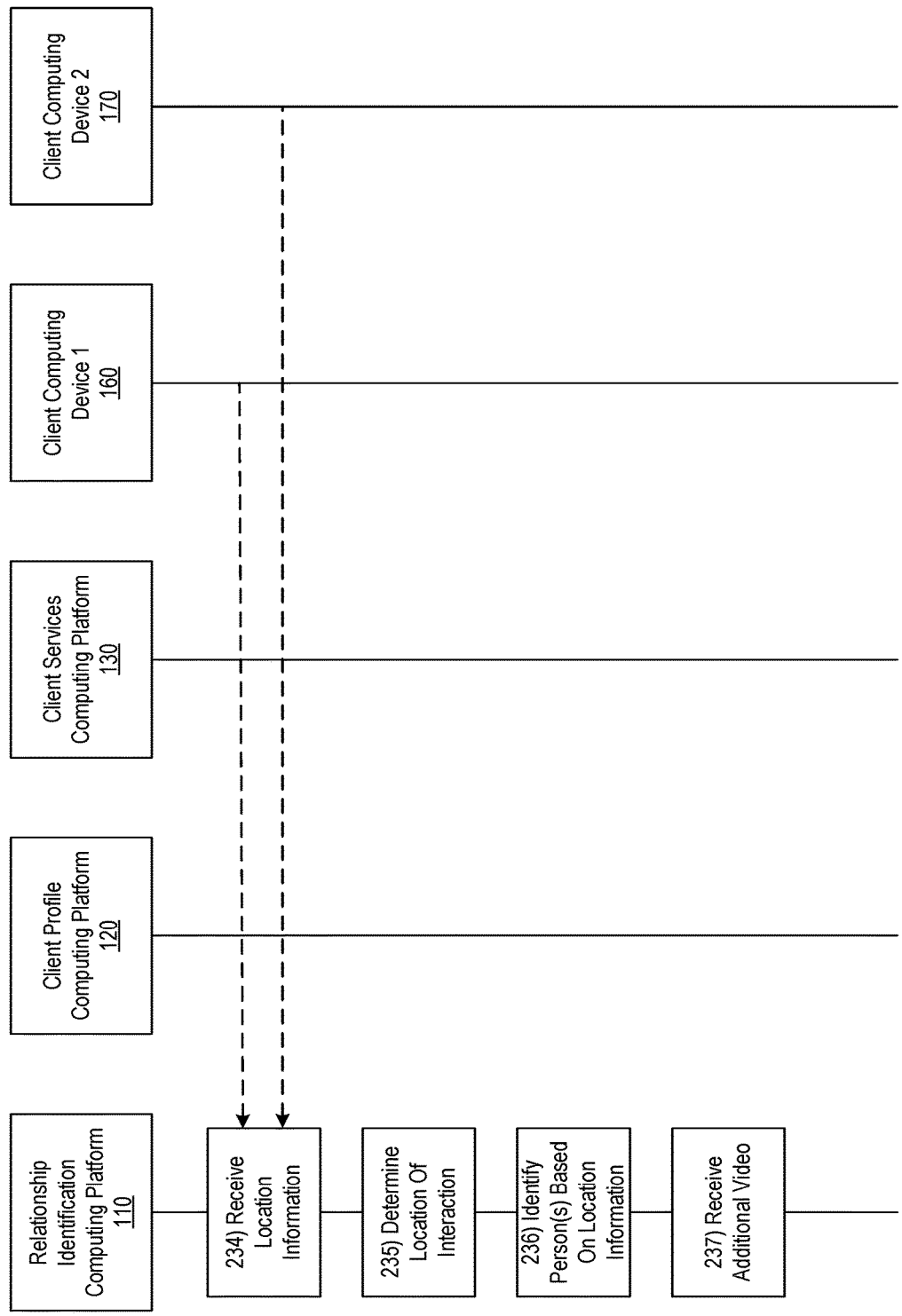

Referring to FIG. 2F, at step 222, relationship identification computing platform 110 may determine a gesture made by the first person to the second person. At step 223, relationship identification computing platform 110 may determine a gesture made by the second person to the first person. At step 224, relationship identification computing platform 110 may determine a touch between the first person and the second person. At step 225, relationship identification computing platform 110 may determine additional information about an interaction between the first person and the second person based one or more gestures made between the first person and the second person and/or one or more touches between the first person and the second person.

Referring to FIG. 2G, at step 226, relationship identification computing platform 110 may receive audio (e.g., audio of an interaction between the first person and the second person). At step 227, relationship identification computing platform 110 may determine, from the audio of the interaction between the first person and the second person, information or additional information about one or more interactions between the first person and the second person.

At step 228, relationship identification computing platform 110 may determine (e.g., from the audio received in step 226) a time length of a conversation between the first person and the second person. At step 229, relationship identification computing platform 110 may store additional information (e.g., based on the time length of the conversation) relating to the relationship between the first person and the second person in the user profile associated with the first person and/or the user profile associated with the second person.

Referring to FIG. 2H, at step 230, relationship identification computing platform 110 may perform facial recognition of one or more received video, images, or the like. At step 231, relationship identification computing platform 110 may, based on the facial recognition, determine additional information about an identity of one or more people (e.g., the first person, the second person).

At step 232, relationship identification computing platform 110 may receive biometric information associated with one or more people (e.g., the first person, the second person). At step 233, relationship identification computing platform 110 may determine additional information about a person (e.g., the first person, the second person) based on the biometric information.

Referring to FIG. 2I, at step 234, relationship identification computing platform 110 may receive location information of a mobile device associated with a person (e.g., receive location information from client computing device 160, receive location information from client computing device 170, receive location information from client computing device 180). At step 235, relationship identification computing platform 110 may determine a location of an interaction between the first person and the second person. For example, if an interaction (e.g., conversation, gesture, touch) is identified (e.g., based on received video, audio, images) between two people at a particular location (e.g., at a retail banking location, a store, a sports arena, a workout facility, a non-profit organization facility, an office), the particular location may be compared to a location of a mobile device associated with a first person of the two people (e.g., client computing device 160) and a location of a mobile device associated with a second person of the two people (e.g., client computing device 170). If the location of the identified interaction, the location of the mobile device associated with the first person, and the location of the mobile device associated with the second person all are at a same location or within a close proximity (e.g., within a proximity threshold) of each other at or close to a time (e.g., within a time threshold) of the identified interaction, relationship identification computing platform 110 may, at step 236, identify additional information about one or more people (e.g., the first person, the second person). For example, relationship identification computing platform 110 may strengthen a confidence level of the interaction between the first person and the second person and/or a confidence level of the relationship between the first person and the second person. Conversely, if the location of the mobile device associated with the first person and the location of the mobile device associated with the second person do not match each other and/or the location of the identified interaction between the first person and the second person, a confidence level of the interaction between the first person and the second person and/or a confidence level of the relationship between the first person and the second person may be reduced (e.g., because the identified interaction might not have been between the first person and the second person, but may have instead been between a third person and a fourth person).

At step 237, relationship identification computing platform 110 may receive additional video. The additional video may be video from a same or different location as other video (e.g., the video received in step 201). The additional video may be video of one or more people (e.g., the first person, the second person, a third person).

Referring to FIG. 2J, at step 238, relationship identification computing platform 110 may identify people in the additional video. For example, relationship identification computing platform 110 may identify the first person in the video, identify the second person in the video, identify a third person in the video, and so on.

At step 239, relationship identification computing platform 110 may determine, from the additional video, a different interaction between people (e.g., a different interaction between the first person and the second person). For example, a different interaction may include a further gesture, touch, conversation, reaction, or other interaction.

At step 240, relationship identification computing platform 110 may determine, from the different interaction between the first person and the second person, additional information about the relationship between the first person and the second person. The additional information may be based on the different interaction. For example, if an initial interaction is a spoken word or part of a conversation between two individuals, and a different interaction is a gesture or touch between the two individuals, the additional information may be a further strengthening of an identified relationship between the two individuals.

At step 241, relationship identification computing platform 110 may store (e.g., in relationship identification computing platform 110, in client profile computing platform 120) the additional information about the relationship between the first person and the second person in the user profile associated with the first person.

Figure 2K:
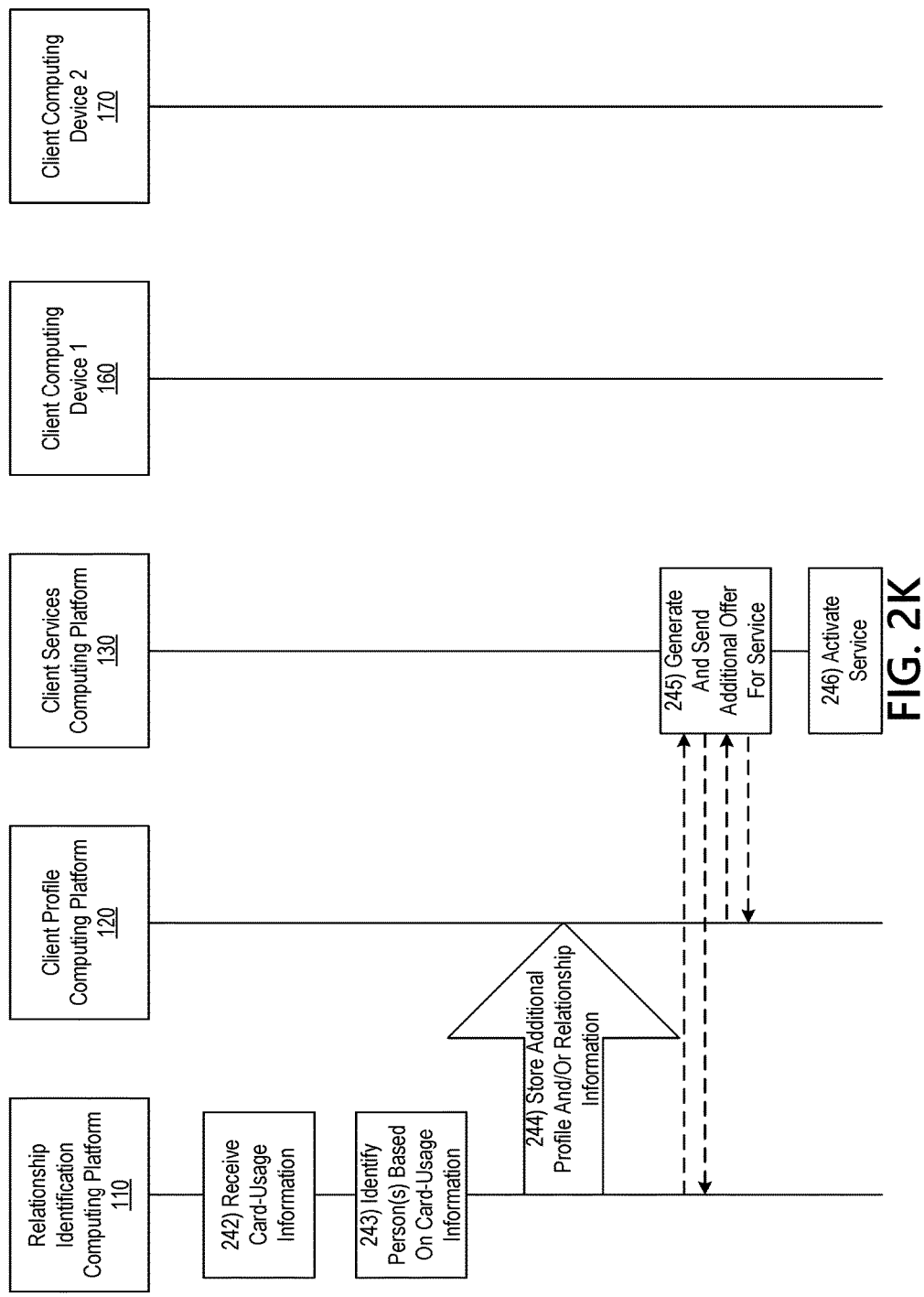

Referring to FIG. 2K, at step 242, relationship identification computing platform 110 may receive card usage information regarding a usage of a card associated with a person (e.g., the first person, the second person). The card usage information may, for example, include time information, location information, and the like. As an example, if a person uses a card (e.g., a smart card, a loyalty card, an ATM card, a bank card, a credit card, a debit card, a gym-membership card, or the like) at a particular location at a particular time, the card usage information may be provided to relationship identification computing platform 110.

At step 243, relationship identification computing platform 110 may identify a person (e.g., the first person, the second person) based on the card usage information. For example, the card usage information may be used to identify that the person was at a particular location at a particular time. In some aspects, relationship identification computing platform 110 may combine the card usage information with other information (e.g., video and/or audio data from the particular location at the particular time) to determine that the person was at the particular location at the particular time.

At step 244, relationship identification computing platform 110 may store additional profile and/or relationship information (e.g., in relationship identification computing platform 110 and/or in client profile computing platform 120). For example, based on card usage information, relationship identification computing platform may store a determination of a time and place of an interaction between two people.

At step 245, client services computing platform 110 may (e.g., by sending to and/or requesting that client services computing platform 130 perform) generate and/or send an additional offer for one or more services.

At step 246, client services computing platform 110 may receive an acceptance of an offer for service, and activate the service based on the received acceptance of the offer for the service. For example, if an offer is for a video streaming service or audio streaming service, client services computing platform 110 may activate permissions for the person to whom the service was offered to begin receiving the streaming video or audio. As another example, if an offer is for a new account with a particular organization (e.g., a banking institution), the new account may be created. As a further example, if an offer is to install a computer-executable software application on a device, the application may be downloaded, installed, and/or activated for use on the device.

Figure 3A:
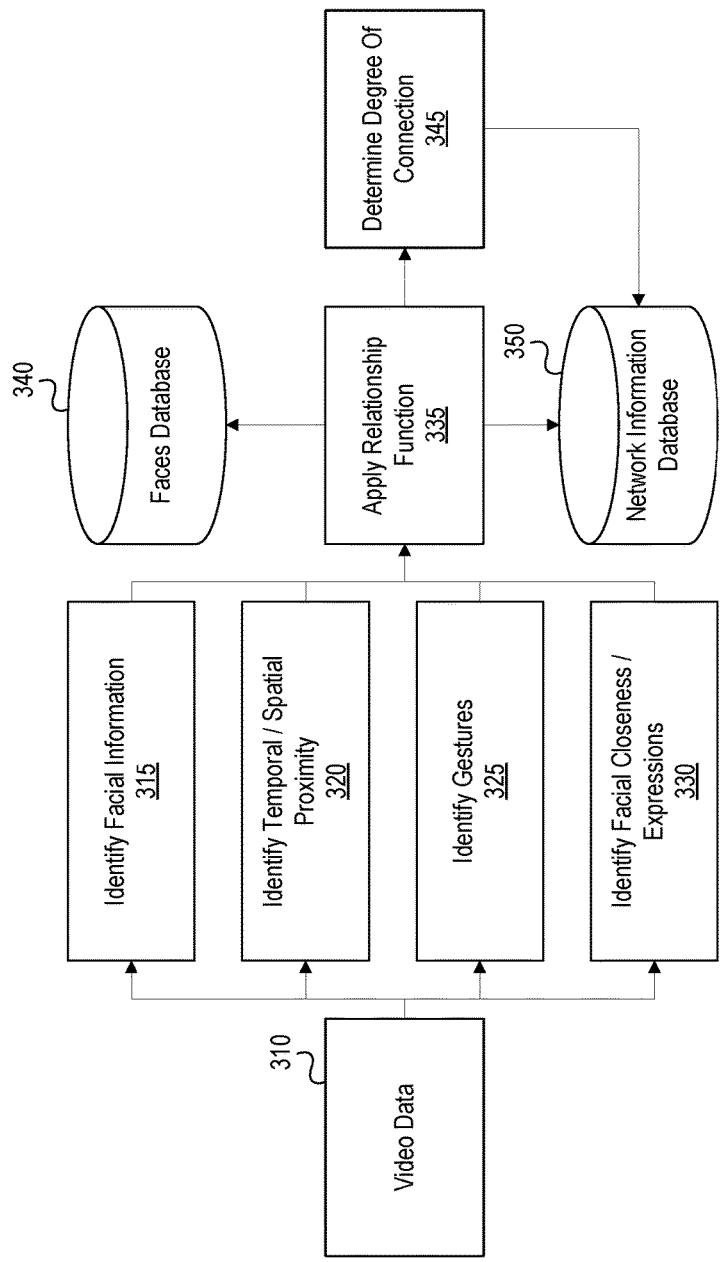
FIG. 3A depicts an illustrative flow diagram for a learning phase of performing image analysis for dynamic personnel identification based on a combination of biometric features in accordance with one or more example embodiments.
Figure 3B:
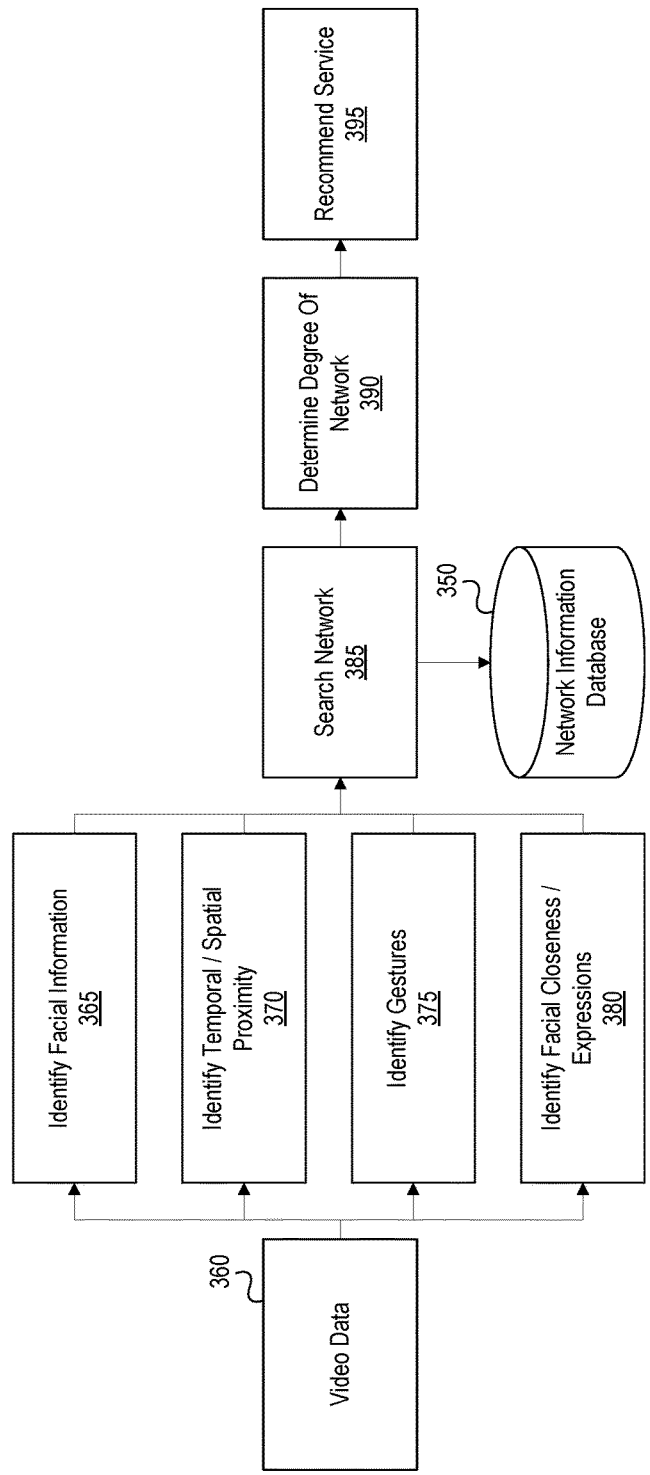
FIG. 3B depicts an illustrative flow diagram for an execution phase of performing image analysis for dynamic personnel identification based on a combination of biometric features in accordance with one or more example embodiments.

FIGS. 3A and 3B depicts a machine learning phase and an execution phase that may be implemented by one or more computing devices performing image analysis for dynamic personnel identification based on a combination of biometric features in accordance with one or more embodiments described herein.

FIG. 3A depicts a machine learning phase for one or more computing devices. Specifically, one or more computing devices may receive customer registration information. A customer may register and/or associate one or more images of the customer with the customer's account at a time of account opening or at a later time. For example, the customer or an organization may request that images be collected and identified as being associated with the customer. Alternatively or additionally, video data (e.g., video data 310) of a customer, customer's family, customer's friends, and the like may be collected. The video data may be collected, for example, at a time of account opening and/or at a later date. The video data may be submitted by the customer (e.g., from a laptop, webcam, phone camera, video camera, or the like). Alternatively or additionally, the video data may be collected at a location (e.g., a retail location, a store, a shopping mall, a sports arena, a retail banking location, a workout facility, a restaurant, an office, or the like).

Using the collected video, one or more computing devices may process the video data (e.g., video data 310) as part of a training phase, during which time one or more computing devices (e.g., relationship identification computing platform 110) may be trained to identify individuals based on face, gender, age group, gestures, and the like. For example, the one or more computing devices may be trained to identify facial information 315. The one or more computing devices may be trained to identify temporal proximity and/or spatial proximity 320. The one or more computing devices may be trained to identify gestures 325. The one or more computing devices may be trained to identify facial closeness and/or facial expressions 330.

The one or more computing devices may apply a relationship function 335 to the video data, based on the information identified (e.g., facial information, temporal proximity, spatial proximity, gestures, facial closeness, and/or facial expressions). The one or more computing devices may add facial information to faces database 340. The one or more computing devices may add customer social network (e.g., relationship information) to network information database 350.

The one or more computing devices may, after applying the relationship function 335, determine a degree of connection between two or more individuals. For example, determining the degree of connection may be performed using bipartite network clustering. Based on the determined degree of connection, the one or more computing devices may update a relationship adjacency matrix (e.g., in network information database 350).

FIG. 3B depicts an execution phase for one or more computing devices. In the execution phase, one or more computing devices may track, identify, and/or find customers and/or other individuals based on face, gender, age group, gestures, and the like. The one or more computing devices may determine relationships between one or more individuals, and/or identify needs and/or services for those individuals based on relationships between those individuals. The execution phase may be performed after at least one machine learning phase (e.g., as illustrated in FIG. 3A). In some aspects, one or more additional machine learning phases may be performed after one or more execution phases. The additional machine learning phases may be used to further train and/or enhance the abilities of the one or more computing devices to accurately and quickly identify customers and/or other individuals.

During the execution phase, one or more computing devices (e.g., relationship identification computing platform 110) may receive video data. The video data may be collected, for example, at a time of account opening and/or at a later date. The video data may be submitted by the customer (e.g., from a laptop, webcam, phone camera, video camera, or the like). Alternatively or additionally, the video data may be collected at a location (e.g., a retail location, a store, a shopping mall, a sports arena, a retail banking location, a workout facility, a restaurant, an office, or the like).

Using the video data, the one or more computing devices may identify facial information 365. In some aspects, the one or more computing devices may determine, based on faces identified in video frames of the video data, whether there is a matching face in a database (e.g., faces database 340).

Using the video data, the one or more computing devices may determine a temporal proximity and/or a spatial proximity 370 between individuals depicted in the video data. This may be performed by using individual video frames. To establish a relationship, a proximity value (e.g., a temporal proximity, a spatial proximity) may be within a threshold. For example, a temporal proximity may be established if two individuals are identified as being at a same location (e.g., retail banking center) within a threshold number of seconds, minutes, or hours. As another example, a spatial proximity may be established if two individuals are identified as being within a threshold distance of each other (e.g., a threshold number of inches, feet, yards, or the like). In some aspects, the spatial proximity and temporal proximity may both need to be satisfied to establish a relationship between two individuals (e.g., two individuals are within a threshold distance of each other for a threshold amount of time). For example, if two people are waiting in line together (e.g., while having a conversation), a spatial proximity and/or temporal proximity may be established.

Using the video data, the one or more computing devices may identify one or more gestures 375. As an example, a gesture may include a movement of a part of a body (e.g., a motion of one or more fingers, one or more hands, a head, one or more feet, one or more toes), such as a wave, a handshake, a nod, or the like. In some aspects, gestures may be identified if a proximity (e.g., a spatial proximity, a temporal proximity) exists between individuals. For example, two people may be within a threshold spatial proximity within a threshold temporal proximity (e.g., the two people are at a same retail banking location from 1:00 PM-1:05 PM).

Using the video data, the one or more computing devices may identify facial closeness and/or facial expressions 380. For example, facial closeness may be determined if the faces of two or more people are within a threshold distance. Furthermore, identified facial expressions may include one or more facial expressions (e.g., smile, frown, smirk, wink, laugh, cry, raised eyebrow, furrowed brow, widened eyes, scrunched face, or the like) made by one or more of the people. In some aspects, the facial expressions might be identified based on the face of the one person being directed at the face or in the direction of another person. For example, if two people are near each other, but not facing each other, an identified facial expression of one of the people might not be identified as being made to the other person.

After identifying information based on the video data, the one or more computing devices may search network 385. In some aspects, a search of the network may be performed using information from network information database 350. Specifically, the one or more computing devices may search information in network information database 350 for information that matches or corresponds to on one or more identified pieces of information (e.g., facial information, temporal proximity, spatial proximity, gestures, facial closeness, facial expressions). For example, if features of an individual's face match features of a face in network information database 350 (which may be determined, e.g., using facial recognition techniques), the one or more computing devices may determine that the person whose face was identified is the person who corresponds to the facial information stored in network information database 350.

After searching network 385, the one or more computing devices may determine and/or update a degree of network between individuals 390. Network information about a particular individual may be stored in a profile associated with that individual (e.g., in network information database 350). Network information may include, e.g., information about one or more relationships between the person whom with the user profile is associated and one or more other individuals.

After determining a degree of network between individuals, the one or more computing devices may recommend a service 395. For example, a service that the first person has may be identified and recommended to one or more other people with whom the first person has a relationship. In some embodiments, an additional feature of the services that the first person has may be identified and recommended to the first person based on the one or more other people with whom the first person has the relationship.

Figure 4:
FIGS. 4-9 depict example graphical user interfaces for performing image analysis for dynamic personnel identification based on a combination of biometric features in accordance with one or more example embodiments.

Referring to FIG. 4, graphical user interface 400 may be presented by an operating system executing on client computing device 160 and/or by a mobile banking application executing on client computing device 160. Graphical user interface 400 may be displayed when launching a mobile banking application, and/or at another phase of use of the application (e.g., after successful login, after a relationship is identified, in a messages portion of the application, and the like). Graphical user interface 400 may include an alert telling a user of a device (e.g., a user of client computing device 160) that one or more potential relationships have been identified between that user and other individuals. Graphical user interface 400 may include one or more links that link to a graphical user interface screen that allows the user to view identified relationships.

Figure 5:
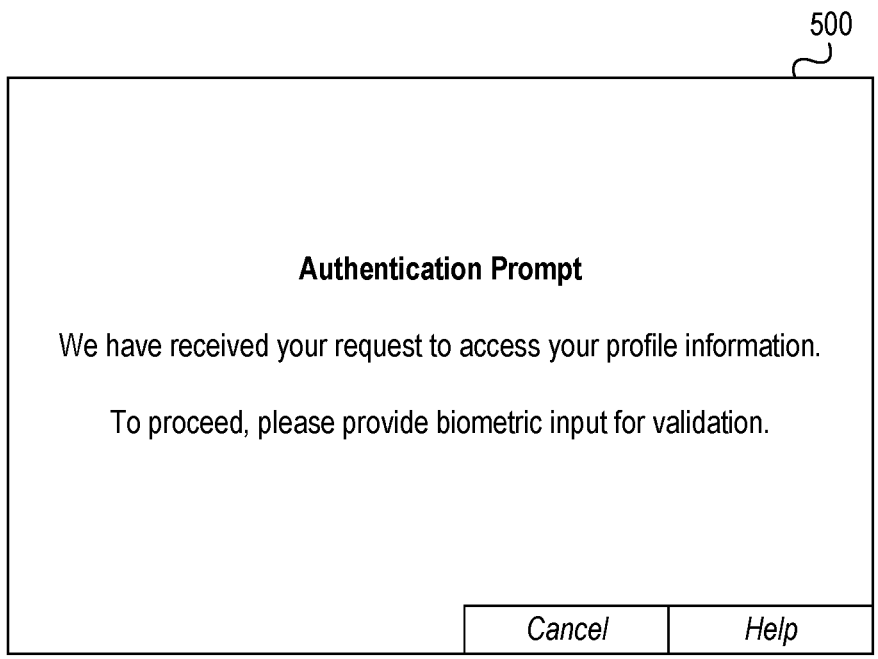

Referring to FIG. 5, graphical user interface 500 may be presented by an operating system executing on client computing device 160 and/or by a mobile banking application executing on client computing device 160, and graphical user interface 500 may include information prompting the user to respond to the biometric prompt generated by client profile computing platform 120 (e.g., "We have received your request to access your profile information. To proceed, please provide biometric input for validation.").

Figure 6:
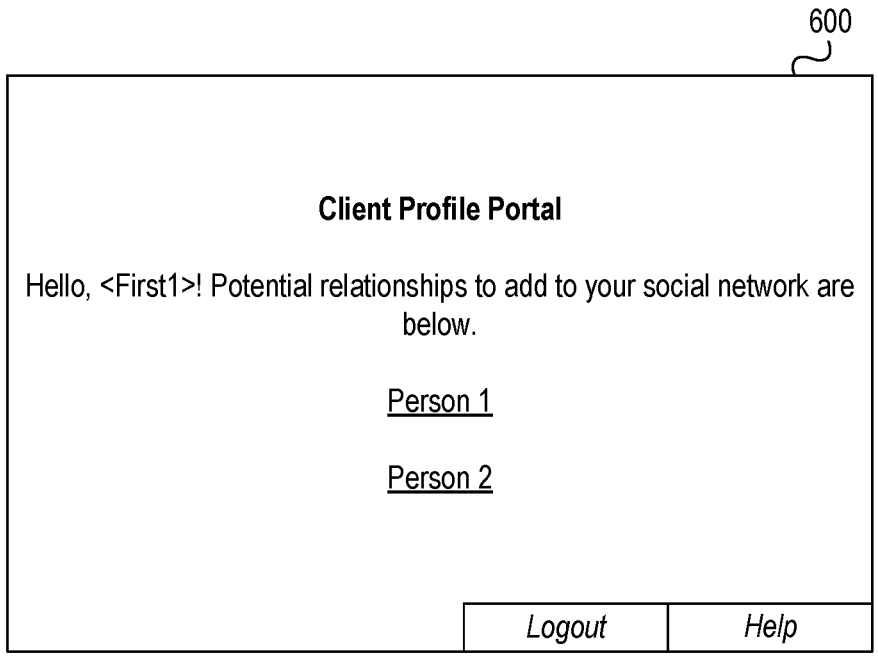

Referring to FIG. 6, graphical user interface 600 may be presented by an operating system executing on client computing device 160 and/or by a mobile banking application executing on client computing device 160. Graphical user interface 600 may include information relating to relationships stored in the client profile (e.g., a client profile associated with a user of client computing device 160). Graphical user interface 600 may allow a user to view potential relationships that have been identified (e.g., based on interactions that the user has had with other people). Graphical user interface 600 includes links to allow the user to view, update, modify, confirm, delete, or otherwise provide more information about or manage potential relationships. For example, graphical user interface 600 may allow a user to view video, images, and/or other information relating to the relationship between the user and the person with whom there is a potential relationship. The user may confirm that a relationship exists, deny that a relationship exists, add more information about the relationship, and the like.

Figure 7:
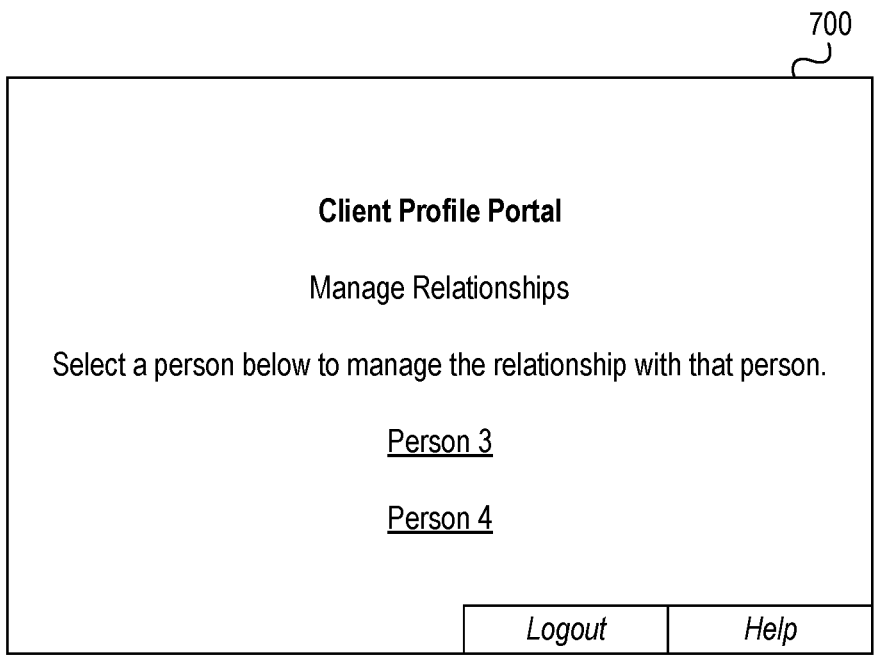

Referring to FIG. 7, graphical user interface 700 may be presented by an operating system executing on client computing device 160 and/or by a mobile banking application executing on client computing device 160. Graphical user interface 700 may include information relating to relationships stored in the client profile (e.g., a client profile associated with a user of client computing device 160). For example, if a client profile is for Person 0, the client profile may store information about a relationship between Person 0 and Person 3, and a relationship between Person 0 and Person 4. Graphical user interface 700 may include links that allow Person 0 to access the client profile and update, modify, confirm, delete, or otherwise provide more information about or manage one or more relationships stored in the client profile for Person 0.

Figure 8:
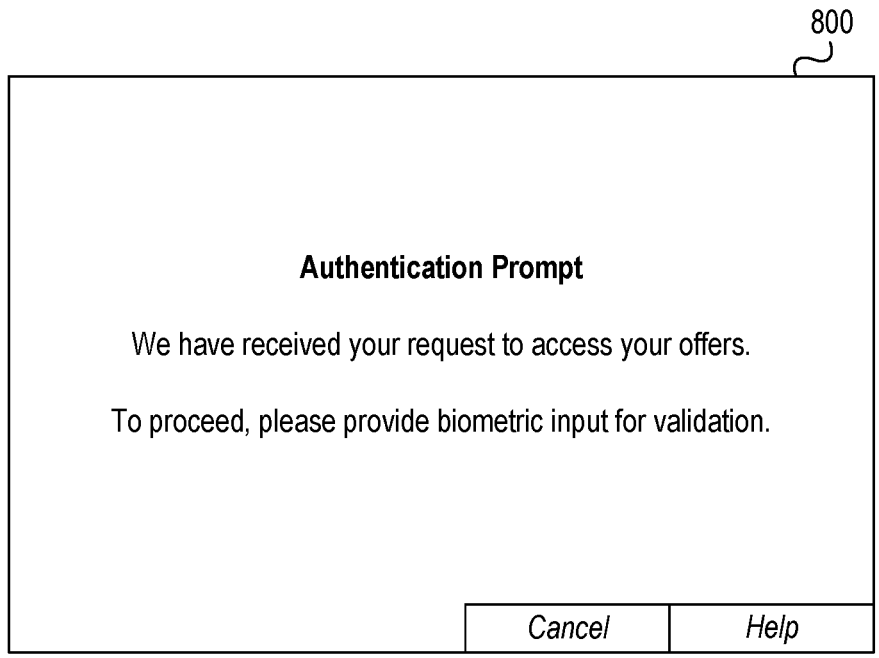

Referring to FIG. 8, graphical user interface 800 may be presented by an operating system executing on client computing device 170 and/or by a mobile banking application executing on client computing device 170, and graphical user interface 800 may include information prompting the user to respond to the biometric prompt generated by client profile computing platform 120 and/or client services computing platform 130 (e.g., "We have received your request to access your offers. To proceed, please provide biometric input for validation.").

Figure 9:

Referring to FIG. 9, graphical user interface 900 may be a client portal interface, such as an online banking portal interface or a mobile banking portal interface, and may be displayed and/or otherwise presented by a browser application executing on client computing device 170 and/or a mobile banking application executed on client computing device 170. In addition, graphical user interface 900 may include one or more offers corresponding to offers generated by client services computing platform 130 for transmission to an identified member of a social network of another individual (e.g., a user of client computing device 160). For example, graphical user interface 900 may include one or more offers for services corresponding to the offers generated by client services computing platform 130.

Figure 10:
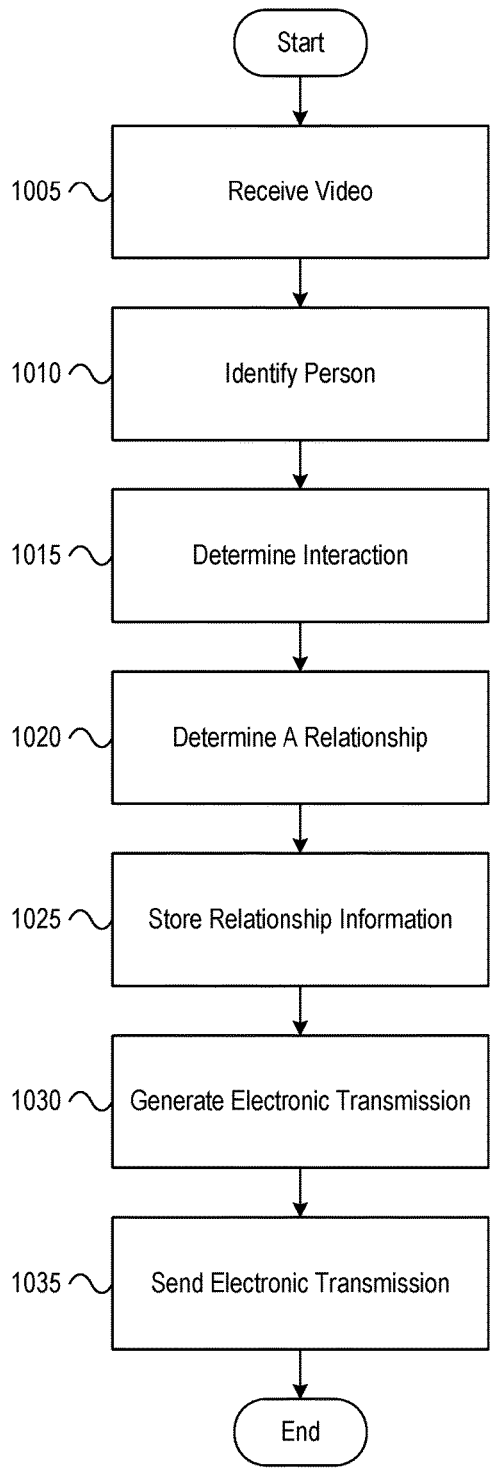
FIG. 10 depicts an illustrative method for performing image analysis for dynamic personnel identification based on a combination of biometric features in accordance with one or more example embodiments.

FIG. 10 depicts an illustrative method for performing image analysis for dynamic personnel identification based on a combination of biometric features in accordance with one or more example embodiments. Referring to FIG. 10, at step 1005, a computing platform having at least one processor, a memory, and a communication interface may receive, via the communication interface, video of one or more persons (e.g., a first person and a second person). At step 1010, the computing platform may identify the first person based on a user profile associated with the first person. At step 1015, the computing platform may determine, from the video, an interaction between the first person and the second person. At step 1020, the computing platform may determine, from the interaction between the first person and the second person, a relationship between the first person and the second person. At step 1025, the computing platform may store information relating to the relationship between the first person and the second person in the user profile associated with the first person. At step 1030, the computing platform may generate an electronic transmission describing an offer for a service to be provided to the second person. In some embodiments, the service to be provided may be selected based on a same service being provided to the first person. At step 1035, the computing platform may send, to an electronic address associated with the second person, the electronic transmission describing the offer for the service to be provided to the second person.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive video of a first person and a second person;
   identify the first person based on a user profile associated with the first person;
   determine, from the video, an interaction between the first person and the second person;
   receive audio of the interaction between the first person and the second person;
   determine, from the interaction between the first person and the second person, a relationship between the first person and the second person;
   determine, from the audio of the interaction between the first person and the second person, audio of a conversation between the first person and the second person;
   determine whether a time length of the conversation is greater than a conversation-time threshold;
   based on the time length of the conversation, store additional information relating to the relationship between the first person and the second person in the user profile associated with the first person;
   store, using an adjacency matrix, information relating to the relationship between the first person and the second person in the user profile associated with the first person;
   use bipartite network clustering to adjust the information relating to the relationship between the first person and the second person in the user profile associated with the first person;
   generate an electronic transmission describing an offer for a service to be provided to the second person, the service to be provided selected based on a same service being provided to the first person; and
   send, to an electronic address associated with the second person, the electronic transmission describing the offer for the service to be provided to the second person.

2. The computing platform of claim 1, wherein the memory stores additional computer-readable instructions that, when executed by the at least one processor, cause the computing platform to:
   receive information identifying a spatial proximity between the first person and the second person.

3. The computing platform of claim 2, wherein the memory stores additional computer-readable instructions that, when executed by the at least one processor, cause the computing platform to:
   in a case that the spatial proximity between the first person and the second person is less than a threshold, determine that the relationship between the first person and the second person is a first type of relationship; and
   in a case that the spatial proximity between the first person and the second person is greater than the threshold, determine that the relationship between the first person and the second person is a second type of relationship.

4. The computing platform of claim 3, wherein determining the spatial proximity between the first person and the second person comprises determining a distance between a face of the first person and a face of the second person.

5. The computing platform of claim 1, wherein determining, from the interaction between the first person and the second person, the relationship between the first person and the second person comprises determining the relationship using a function with at least four parameters as inputs, the at least four parameters comprising a first measure of temporal proximity between the first person and the second person, a second measure of a spatial proximity between the first person and the second person, a third measure of the interaction between the first person and the second person, and a fourth measure of a facial closeness or facial expression between the first person and the second person.

6. The computing platform of claim 5, wherein determining the relationship using the function with the at least four parameters as inputs comprises applying a weighting to each of the at least four parameters.

7. The computing platform of claim 6, wherein applying the weighting to each of the at least four parameters comprises applying a non-zero weighting to a parameter of the at least four parameters if a measure of the parameter is above a weighting threshold, and applying a zero weighting to the parameter of the at least four parameters if the measure of the parameter is below the weighting threshold.

8. The computing platform of claim 7, wherein applying the weighting to each of the at least four parameters is based on the information relating to the relationship between the first person and the second person stored in the user profile.

9. The computing platform of claim 1, wherein determining, from the video, the interaction between the first person and the second person comprises determining at least one of a gesture made by the first person to the second person, a gesture made by the second person to the first person, or a touch between the first person and the second person.

10. The computing platform of claim 1, wherein the memory stores additional computer-readable instructions that, when executed by the at least one processor, cause the computing platform to:
perform facial recognition, using the video, to determine an identity of the second person; and
perform facial recognition, using the video, of the first person, wherein identifying the first person is further based on performing the facial recognition of the first person.

11. The computing platform of claim 1, wherein the memory stores additional computer-readable instructions that, when executed by the at least one processor, cause the computing platform to:
receive biometric information associated with the first person, wherein identifying the first person is further based on the biometric information associated with the first person.

12. The computing platform of claim 1, wherein the memory stores additional computer-readable instructions that, when executed by the at least one processor, cause the computing platform to:
receive location information of a mobile device associated with the first person; and
determine a location of the interaction between the first person and the second person,
wherein identifying the first person is further based on the location information of the mobile device associated with the first person corresponding with the location of the interaction between the first person and the second person.

13. The computing platform of claim 1, wherein the memory stores additional computer-readable instructions that, when executed by the at least one processor, cause the computing platform to:
receive second video of the first person and the second person;
identify the first person in the second video;
identify the second person in the second video;
determine, from the second video, a second interaction between the first person and the second person;
determine, from the second interaction between the first person and the second person, additional information about the relationship between the first person and the second person; and
store the additional information about the relationship between the first person and the second person in the user profile associated with the first person.

14. The computing platform of claim 1, wherein the memory stores additional computer-readable instructions that, when executed by the at least one processor, cause the computing platform to:
receive card usage information regarding a usage of a card associated with one of the first person or the second person at a time that the first person and the second person are within a spatial proximity between the first person and the second person; and
identify the one of the first person or the second person based on the card usage information.

15. A method, comprising:
at a computing platform comprising at least one processor, memory, and a communication interface:
receive video of a first person and a second person;
identify the first person based on a user profile associated with the first person;
determine, from the video, an interaction between the first person and the second person;
receive audio of the interaction between the first person and the second person;
determine, from the interaction between the first person and the second person, a relationship between the first person and the second person;
determine, from the audio of the interaction between the first person and the second person, audio of a conversation between the first person and the second person;
determine whether a time length of the conversation is greater than a conversation-time threshold;
based on the time length of the conversation, store additional information relating to the relationship between the first person and the second person in the user profile associated with the first person;
store, using an adjacency matrix, information relating to the relationship between the first person and the second person in the user profile associated with the first person;
use bipartite network clustering to adjust the information relating to the relationship between the first person and the second person in the user profile associated with the first person;
generate an electronic transmission describing an offer for a service to be provided to the second person, the service to be provided selected based on a same service being provided to the first person; and
send, to an electronic address associated with the second person, the electronic transmission describing the offer for the service to be provided to the second person.

16. One or more non-transitory computer-readable media storing instructions that, when executed by a computing platform comprising at least one processor, memory, and a communication interface, cause the computing platform to:
receive video of a first person and a second person;
identify the first person based on a user profile associated with the first person;
determine, from the video, an interaction between the first person and the second person;
receive audio of the interaction between the first person and the second person;
determine, from the interaction between the first person and the second person, a relationship between the first person and the second person;
determine, from the audio of the interaction between the first person and the second person, audio of a conversation between the first person and the second person;

determine whether a time length of the conversation is greater than a conversation-time threshold;
based on the time length of the conversation, store additional information relating to the relationship between the first person and the second person in the user profile associated with the first person;
store, using an adjacency matrix, information relating to the relationship between the first person and the second person in the user profile associated with the first person;
use bipartite network clustering to adjust the information relating to the relationship between the first person and the second person in the user profile associated with the first person;
generate an electronic transmission describing an offer for a service to be provided to the second person, the service to be provided selected based on a same service being provided to the first person; and
send, to an electronic address associated with the second person, the electronic transmission describing the offer for the service to be provided to the second person.

17. The one or more non-transitory computer-readable media of claim 16, wherein the instructions, when executed, cause the computing platform to:
determine at least one of a gesture made by the first person to the second person, a gesture made by the second person to the first person, or a touch between the first person and the second person.

18. The one or more non-transitory computer-readable media of claim 16, wherein the instructions, when executed, cause the computing platform to:
perform facial recognition, using the video, to determine an identity of the second person; and
perform facial recognition, using the video, of the first person, wherein identifying the first person is further based on performing the facial recognition of the first person.

19. The one or more non-transitory computer-readable media of claim 16, wherein the instructions, when executed, cause the computing platform to:
receive location information of a mobile device associated with the first person; and
determine a location of the interaction between the first person and the second person,
wherein identifying the first person is further based on the location information of the mobile device associated with the first person corresponding with the location of the interaction between the first person and the second person.

20. The method of claim 15, comprising:
at the computing platform comprising the at least one processor, the memory, and the communication interface:
determine, at the computing platform, at least one of a gesture made by the first person to the second person, a gesture made by the second person to the first person, or a touch between the first person and the second person.

21. The method of claim 15, comprising:
at the computing platform comprising the at least one processor, the memory, and the communication interface:
perform, at the computing platform, facial recognition, using the video, to determine an identity of the second person; and
perform, at the computing platform, facial recognition, using the video, of the first person, wherein identifying the first person is further based on performing the facial recognition of the first person.

22. The method of claim 15, comprising:
at the computing platform comprising the at least one processor, the memory, and the communication interface:
receive, at the computing platform, location information of a mobile device associated with the first person; and
determine, at the computing platform, a location of the interaction between the first person and the second person,
wherein identifying the first person is further based on the location information of the mobile device associated with the first person corresponding with the location of the interaction between the first person and the second person.

23. The method of claim 15, comprising:
at the computing platform comprising the at least one processor, the memory, and the communication interface:
receive information identifying a spatial proximity between the first person and the second person;
in a case that the spatial proximity between the first person and the second person is less than a threshold, determine that the relationship between the first person and the second person is a first type of relationship; and
in a case that the spatial proximity between the first person and the second person is greater than the threshold, determine that the relationship between the first person and the second person is a second type of relationship.

24. The method of claim 15, comprising:
at the computing platform comprising the at least one processor, the memory, and the communication interface:
receive second video of the first person and the second person;
identify the first person in the second video;
identify the second person in the second video;
determine, from the second video, a second interaction between the first person and the second person;
determine, from the second interaction between the first person and the second person, additional information about the relationship between the first person and the second person; and
store the additional information about the relationship between the first person and the second person in the user profile associated with the first person.

25. The one or more non-transitory computer-readable media of claim 16, wherein the instructions, when executed, cause the computing platform to:
receive information identifying a spatial proximity between the first person and the second person;
in a case that the spatial proximity between the first person and the second person is less than a threshold, determine that the relationship between the first person and the second person is a first type of relationship; and
in a case that the spatial proximity between the first person and the second person is greater than the threshold, determine that the relationship between the first person and the second person is a second type of relationship.

26. The one or more non-transitory computer-readable media of claim 16, wherein the instructions, when executed, cause the computing platform to:

receive second video of the first person and the second person;
identify the first person in the second video;
identify the second person in the second video;
determine, from the second video, a second interaction between the first person and the second person;
determine, from the second interaction between the first person and the second person, additional information about the relationship between the first person and the second person; and
store the additional information about the relationship between the first person and the second person in the user profile associated with the first person.

* * * * *